(12) United States Patent
Woo et al.

(10) Patent No.: US 11,777,551 B2
(45) Date of Patent: Oct. 3, 2023

(54) ANTENNA MODULE HAVING MULTILAYER IMPEDANCE CONVERTER, AND ELECTRONIC DEVICE COMPRISING SAME

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/922,969

(22) PCT Filed: Jul. 20, 2021

(86) PCT No.: PCT/KR2021/009362
§ 371 (c)(1),
(2) Date: Nov. 2, 2022

(87) PCT Pub. No.: WO2022/055122
PCT Pub. Date: Mar. 17, 2022

(65) Prior Publication Data
US 2023/0163802 A1    May 25, 2023

(30) Foreign Application Priority Data

Sep. 8, 2020    (KR) .......................... 10-2020-0114705

(51) Int. Cl.
*H04B 1/40*    (2015.01)
*H01Q 1/22*    (2006.01)
(Continued)

(52) U.S. Cl.
CPC .............. *H04B 1/40* (2013.01); *H01P 3/081* (2013.01); *H01Q 1/2291* (2013.01); *H01Q 9/045* (2013.01)

(58) Field of Classification Search
None
See application file for complete search history.

(56) References Cited

U.S. PATENT DOCUMENTS

| 7,986,280 B2 * | 7/2011 | Semonov | ............. H01Q 25/005 |
| | | | 343/810 |
| 8,354,972 B2 * | 1/2013 | Borja | ....................... H01Q 1/38 |
| | | | 343/815 |

(Continued)

FOREIGN PATENT DOCUMENTS

| KR | 20170095453 | 8/2017 |
| KR | 20180105833 | 10/2018 |

(Continued)

OTHER PUBLICATIONS

PCT International Application No. PCT/KR2021/009362, International Search Report dated Nov. 16, 2021, 3 pages.

*Primary Examiner* — Pablo N Tran
(74) *Attorney, Agent, or Firm* — LEE, HONG, DEGERMAN, KANG & WAIMEY PC

(57) ABSTRACT

Provided is an electronic device having an antenna module according to one embodiment. The electronic device comprises: a transceiver circuit disposed in the antenna module composed of a multi-layer substrate; a first transmission line disposed on the first layer of the antenna module and configured to be electrically connected to the transceiver circuit; a second transmission line disposed on the second layer of the antenna module and configured to be electrically connected to the antenna; and a vertical via configured to vertically connect the first transmission line and the second transmission line, wherein at least one of the first and second transmission lines connected to the vertical via has an impedance converter.

20 Claims, 23 Drawing Sheets

(51) Int. Cl.
*H01Q 9/04* (2006.01)
*H01P 3/08* (2006.01)

(56) References Cited

U.S. PATENT DOCUMENTS

| | | | |
|---|---|---|---|
| 10,608,344 B2* | 3/2020 | Paulotto | H01Q 3/2652 |
| 11,139,588 B2* | 10/2021 | Edwards | H01Q 21/061 |
| 11,683,054 B2* | 6/2023 | Cui | H04B 1/0057 |
| | | | 455/77 |
| 2018/0090816 A1* | 3/2018 | Mow | H01Q 9/0421 |
| 2019/0115875 A1* | 4/2019 | Nikolayenkov | H03F 3/189 |
| 2020/0343636 A1* | 10/2020 | Nikolayenkov | H01Q 23/00 |

FOREIGN PATENT DOCUMENTS

| | | |
|---|---|---|
| KR | 20190118962 | 10/2019 |
| KR | 20200046482 | 5/2020 |
| KR | 20200079834 | 7/2020 |

* cited by examiner (a)

(b)

(a)

(b)

(a)

(b)

(a)

(b)

FRONT VIEW (a)

SIDE VIEW (b)

(a)

(b)

(a)

(b)

(a)

(b)

(c)

ANTENNA MODULE HAVING MULTILAYER IMPEDANCE CONVERTER, AND ELECTRONIC DEVICE COMPRISING SAME

CROSS-REFERENCE TO RELATED APPLICATIONS

This application is the National Stage filing under 35 U.S.C. 371 of International Application No. PCT/KR2021/009362 filed on Jul. 20, 2021, which claims the benefit of earlier filing date and right of priority to Korean Application No. 10-2020-0114705, filed on Sep. 8, 2020, the contents of which are all incorporated by reference herein in their entirety.

TECHNICAL FIELD

The present specification relates to an antenna module and an electronic device including the same. A particular implementation relates to an antenna module including a multi-layer impedance transformer, and an electronic device including the antenna module.

BACKGROUND ART

As functions of electronic devices diversify, an image display apparatus such as a multimedia player having composite functions such as playback of music or video files, games, broadcasting reception, etc. may be implemented.

The image display apparatus is an apparatus configured to playback image content, and receives an image from various sources and plays the image back. The image display apparatus is implemented as various devices such as a smartphone, a tablet PC, a laptop computer, a TV, etc. The image display apparatus such as a smart TV, etc. may provide an application for providing web content such as a web browser, etc.

A communication module including an antenna may be provided so that the electronic device such as the image display device may perform communication with a neighboring electronic device. Recently, as a display area of the image display device is enlarged, an arrangement space of the communication module including the antenna is reduced. Accordingly, there is an increasing need for arranging an antenna in a multi-layer circuit board on which the communication module is implemented.

A WiFi wireless interface may be considered as an interface for a communication service between electronic devices. When using such a WiFi wireless interface, a mmWave band may be used for high-speed data transmission between electronic devices. In particular, high-speed data transmission between electronic devices may be performed using a wireless interface such as an 802.11ay.

In relation to this, an array antenna capable of operating in a mmWave band may be mounted in the antenna module. However, electronic components such as an antenna and a transceiver circuit arranged in the antenna module are configured to be electrically connected to each other. In relation to this, electronic components arranged on different layers may be electrically connected to each other through a multi-layered transmission line, and thus, a vertical via structure may be provided.

In a high frequency band such as a mmWave band, there is such a problem that impedance mismatch between transmission lines and a line loss may occur significantly due to the vertical via structure. In addition, when a plurality of antennas are arranged in the multi-layer substrate, a large amount of line loss may occur according to provision of a detour path of a transmission line in order to avoid overlap between the transmission lines.

DISCLOSURE OF INVENTION

Technical Problem

The present disclosure is directed to solving the aforementioned problems and other drawbacks. Another aspect of the present disclosure is to provide an antenna module including a multi-layer impedance transformer operating in a millimeter wave band, and an electronic device including the same.

Another aspect of the present disclosure is to solve such a problem that which line loss increases due to the provision of a detour path of a plurality of feeding lines configured to feed a plurality of antenna elements constituting an array antenna in a mmWave band.

Another aspect of the present disclosure is to solve such a problem that impedance mismatch due to vertical vias increases through a multi-layer impedance conversion structure between an RFIC and an antenna element arranged on a PCB having a form of a multi-layer substrate.

Another aspect of the present disclosure is to provide a broadband feeding line structure capable of improving impedance matching characteristics of an antenna element electrically connected to a feeding line inside a PCB having a form of a multi-layer substrate.

Solution to Problem

To achieve these and other advantages and in accordance with the purpose of the present invention, as embodied and broadly described herein, there is provided an electronic device including an antenna module. The electronic device includes: a transceiver circuit disposed in the antenna module composed of a multi-layer substrate; a first transmission line disposed on the first layer of the antenna module and configured to be electrically connected to the transceiver circuit; a second transmission line disposed on the second layer of the antenna module and configured to be electrically connected to the antenna; and a vertical via configured to vertically connect the first transmission line and the second transmission line, wherein at least one of the first and second transmission lines connected to the vertical via has an impedance transformer.

In an embodiment, a first impedance transformer arranged in the first transmission line connected to the vertical via may be configured to have a first width W1 and a first length L1, and a second impedance transformer arranged in the second transmission line connected to the vertical via may be configured to have a second width W2 and a second length L2.

In an embodiment, the first transmission line may include a microstrip line in which an air layer is provided without a dielectric on a conductive line arranged on a dielectric, and the second transmission line may include a strip line in which dielectrics are disposed on and below a conductive line, respectively.

In an embodiment, a ratio L1/L2 of the first length L1 of the first impedance transformer to the second length L2 of the second impedance transformer may be set to be within a range from 0.45 to 1.35.

In an embodiment, a ratio W2/W1 of the first width W1 of the first impedance transformer to the second width W2 of the second impedance transformer may be set to be within a range from 0.32 to 0.71.

In an embodiment, the first impedance transformer may be configured, in the microstrip line, to have the first width W1 corresponding to a first impedance and the first length L1 of a quarter wavelength that is a ¼ of a wavelength corresponding to an operating frequency, and perform impedance matching between a 50 ohm impedance of the first transmission line and a second impedance in an upper end region of the vertical via.

In an embodiment, the second impedance transformer may be configured, in the strip line, to have the second width W2 corresponding to a third impedance and the second length L2 of a quarter wavelength that is a ¼ of a wavelength corresponding to an operating frequency, and perform impedance matching between a 50 ohm impedance of the second transmission line and a fourth impedance in a lower end region of the vertical via.

In an embodiment, the first width W1 of the first impedance transformer may be greater than a 50 ohm line width of the first transmission line, and the second width W2 of the second impedance transformer may be greater than a 50 ohm line width of the second transmission line and smaller than the first width W1.

In an embodiment, the first width W1 of the first impedance transformer may be same as a 50 ohm line width of the first transmission line, and the second width W2 of the second impedance transformer may be different from a 50 ohm line width of the second transmission line.

In an embodiment, the second width W2 of the second impedance transformer may be same as a 50 ohm line width of the second transmission line, and the first width W1 of the first impedance transformer may be different from a 50 ohm line width of the first transmission line.

In an embodiment, the first transmission line may include: the first impedance transformer connected to the vertical via and has a first width W1 and a first length L1, and a third impedance transformer connected to one end of the first impedance transformer and configured to have a third width W3 and a third length L3, to perform impedance conversion between the first impedance transformer and the first transmission line with 50 ohm impedance. The third width W3 may be smaller than the first width W1 and greater than a 50 ohm line width of the first transmission line.

In an embodiment, the second transmission line may includes: the second impedance transformer connected to the vertical via and configured to have the second width W2 and the second length L2; and a fourth impedance transformer connected to one end of the second impedance transformer and configured to have a fourth width W4 and a fourth length L4, to perform impedance conversion between the second impedance transformer and the second transmission line with 50 ohm impedance. The fourth width W4 may be smaller than the second width W2 and greater than a 50 ohm line width of the second transmission line.

In an embodiment, the antenna may be electrically connected to the second transmission line through a second vertical via. The antenna may be a lower antenna configured to radiate a signal toward a lower direction of the antenna module.

In an embodiment, the vertical via may include a plurality of via pads and a plurality of vertical connection parts to vertically connect the microstrip line arranged on an uppermost layer of the multi-layer substrate to the strip line arranged in the multi-layer substrate. The plurality of via pads, arranged on different layers, are disposed on same layers as layers of grounds to have gaps with a certain width between the plurality of via pads and the grounds, respectively.

In an embodiment, the plurality of via pads, arranged on different layers, may be disposed on same layers as layers of grounds to have gaps with certain different widths between the plurality of via pads and the grounds, respectively. At least one of the first impedance transformer and the second impedance transformer may be implemented to have a line width of 50 ohms.

In an embodiment, the antenna modules may further include: the lower antenna; a side antenna arranged inside the multi-layer substrate and configured to radiate a signal toward a side direction of the multi-layer substrate; and a ground via wall arranged at a further inner position in the multi-layer substrate compared to the side antenna, and configured to vertically connect different ground layers to each other.

In an embodiment, the ground via wall may be arranged at a further inner position in the multi-layer substrate compared to the side antenna to improve directivity, toward a side direction, of a signal radiated by the side antenna.

In an embodiment, the antenna module may include a first antenna and a second antenna arranged further apart from the transceiver circuit compared to the first antenna. The transceiver circuit may be connected to the first antenna through a first microstrip line and a first strip line, and connected to the second antenna through a second microstrip line and a second strip line. A length of the second microstrip line may be greater than a length of the first microstrip line to compensate for a difference between a length from the transceiver circuit to the first antenna and a length from the transceiver circuit to the second antenna.

According to another aspect of the present specification, there is also provided an antenna module including: a first transmission line disposed on a first layer of the antenna module and configured to be electrically connected to a transceiver circuit; a second transmission line disposed on a second layer of the antenna module and configured to be electrically connected to an antenna; and a vertical via configured to vertically connect the first transmission line and the second transmission line.

In an embodiment, a first impedance transformer, arranged in the first transmission line connected to the vertical via, may be configured to have a first width W1 and a first length L1, and a second impedance transformer, arranged in the second transmission line connected to the vertical via, may be configured to have a second width W2 and a second length L2.

In an embodiment, the first transmission line may include a microstrip line in which an air layer is provided without a dielectric on a conductive line arranged on a dielectric, and the second transmission line may include a strip line in which dielectrics are disposed on and below a conductive line, respectively.

In an embodiment, a ratio L1/L2 of the first length L1 of the first impedance transformer to the second length L2 of the second impedance transformer may be set to be within a range from 0.45 to 1.35.

In an embodiment, a ratio W2/W1 of the first width W1 of the first impedance transformer to the second width W2 of the second impedance transformer may be set to be within a range from 0.32 to 0.71.

Advantageous Effects of Invention

Technical effects of the antenna module having the multilayer impedance conversion structure operating in a millimeter wave band and the electronic device including the same are described below.

According to an embodiment, an antenna module in which all feeding lines may be arranged using a small number of layers in a space in which it is difficult to arrange all the feeding lines may be provided.

According to an embodiment, a feeding line may be connected, along minimized detour paths, to all antennas in the mmWave antenna module having an extended coverage to thereby minimize a line loss.

According to an embodiment, both performance of a transmission loss S11 and performance of a transmission loss S21 may be enhanced through impedance matching of feeding lines in a broadband of the millimeter wave band.

According to an embodiment, impedance matching characteristics of an antenna element electrically connected to a feeding line inside a multi-layered board type PCB may be enhanced by configuring different types of impedance transformers with reference to vertical vias.

According to an embodiment, transmission lines including a microstrip line and a strip line are connected to each other via a vertical via and an impedance transformer is provided on at least one side to thereby minimize a line loss while performing impedance matching.

According to an embodiment, by adjusting a gap interval between a vertical via and an adjacent ground, the vertical via connecting transmission lines on different layers to each other, a line loss may be minimized while impedance matching is performed.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
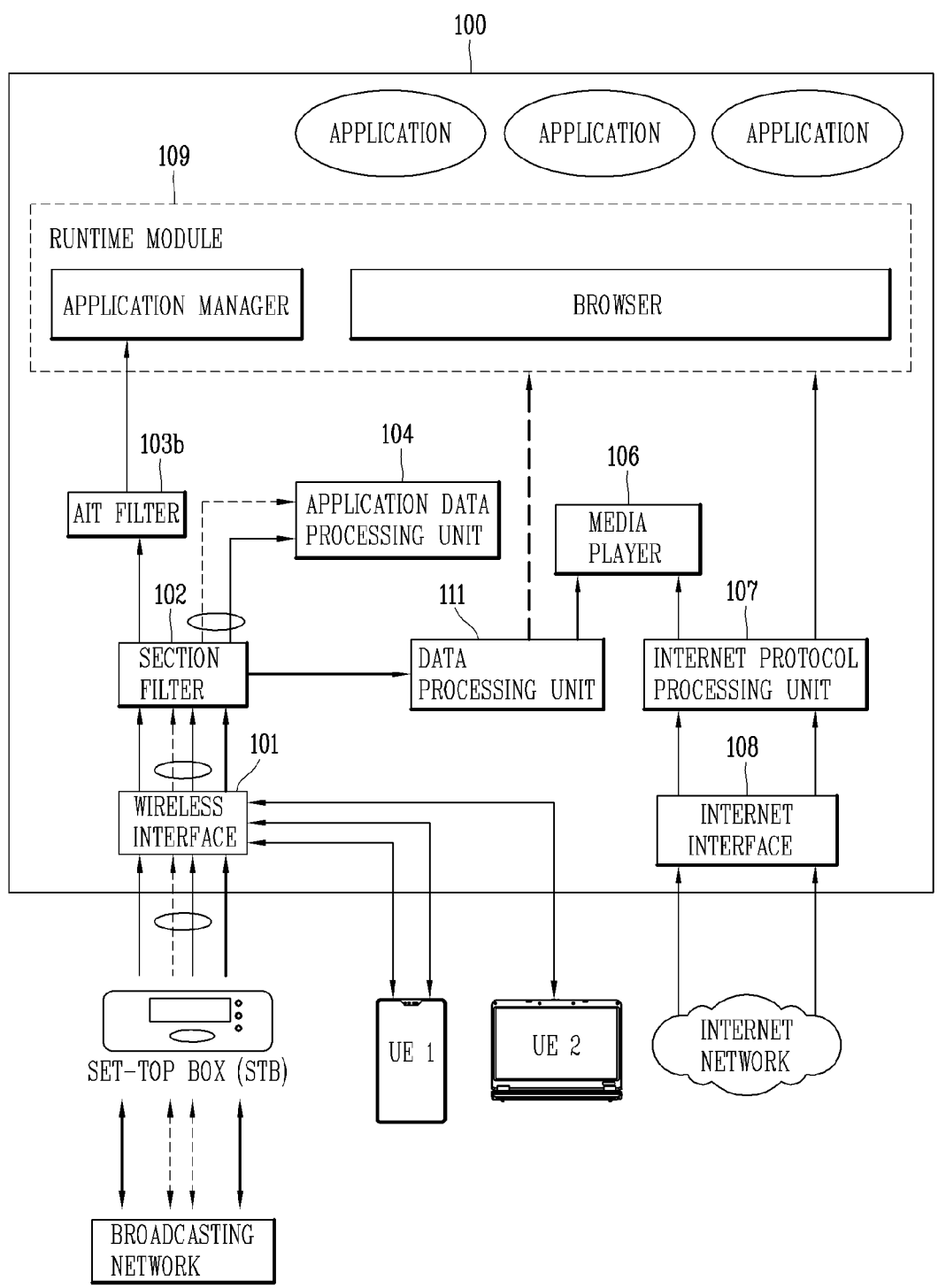
FIG. 1 is a diagram schematically illustrating an example of a whole pf a wireless audiovisual (AV) system including an image display device according to an embodiment of the present specification.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

FIG. 1 is a diagram schematically illustrating an example of a whole pf a wireless audiovisual (AV) system including an image display device according to an embodiment of the present specification.

As illustrated in FIG. 1, the image display device 100 according to another embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be configured to be connected to a server or another electronic device via a wireless communication system. As an example, the image display device 100 needs to provide an 802.11ay communication service operating in a millimeter wave (mmWave) band to transmit or receive large-capacity data at a high speed.

The mmWave band may be any frequency band in a range of 10 GHz to 300 GHz. In this specification, the mmWave band may include an 802.11 ay band of a 60 GHz band. In addition, the mmWave band may include a 5G frequency band of a 28 GHz band or the 802.1ay band of the 60 GHz band. The 5G frequency band may be set to about 24 to 43 GHz band and the 802.11ay band may be set to 57 to 70 GHz or 57 to 63 GHz band, but are not limited thereto.

The image display device 100 may wirelessly transmit or receive data to/from an electronic device in a periphery of the image display device 100, e.g., a set-top box or another electronic device, via the wireless interface. As an example, the image display device 100 may transmit or receive wireless AV data to/from a set-top box or another electronic device, e.g., a mobile terminal arranged in front of or below the image display device.

The image display device 100 includes, for example, a wireless interface 101b, a section filter 102b, an application information table (AIT) filter 103b, an application data processing unit 104b, a data processing unit 111b, a media player 106b, an Internet protocol processing unit 107b, an Internet interface 108b, and a runtime module 109b.

Through a broadcast interface that is the wireless interface 101b, AIT data, real-time broadcast content, application data, and a stream event are received. The real-time broadcast content may be referred to as linear audio/video (A/V) content.

The section filter 102b performs section filtering on four types of data received through the wireless interface 101b to transmit the AIT data to the AIT filter 103b, the linear AV content to the data processing unit 111b, and the stream events and the application data to the application data processing unit 104b.

Non-linear AV content and the application data are received through the Internet interface 108b. The non-linear AV content may be, for example, a content on demand (COD) application. The non-linear AV content is transmitted to the media player 106b, and the application data is transmitted to the runtime module 109b.

Further, the runtime module 109b includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device is described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting an 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, it may be configured to provide a coverage of 10 meters or longer in an indoor environment, and 100 meters or longer in an outdoor environment with a line of sight (LOS) channel condition.

The electronic device supporting the 802.11ay wireless interface may be configured to provide visual reality (VR) headset connectivity, support server backups, and support cloud applications that require low latency.

An ultra short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, the 8K UHD Wireless Transfer at Smart Home Usage Model may be taken into account. In the Smart Home Usage Model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in a mmWave band and an electronic device including the same is described with reference to the accompanying drawings. It will be apparent to those skilled in the art that the present disclosure may be embodied in other specific forms without departing from the spirit or essential characteristics thereof.

Figure 2:
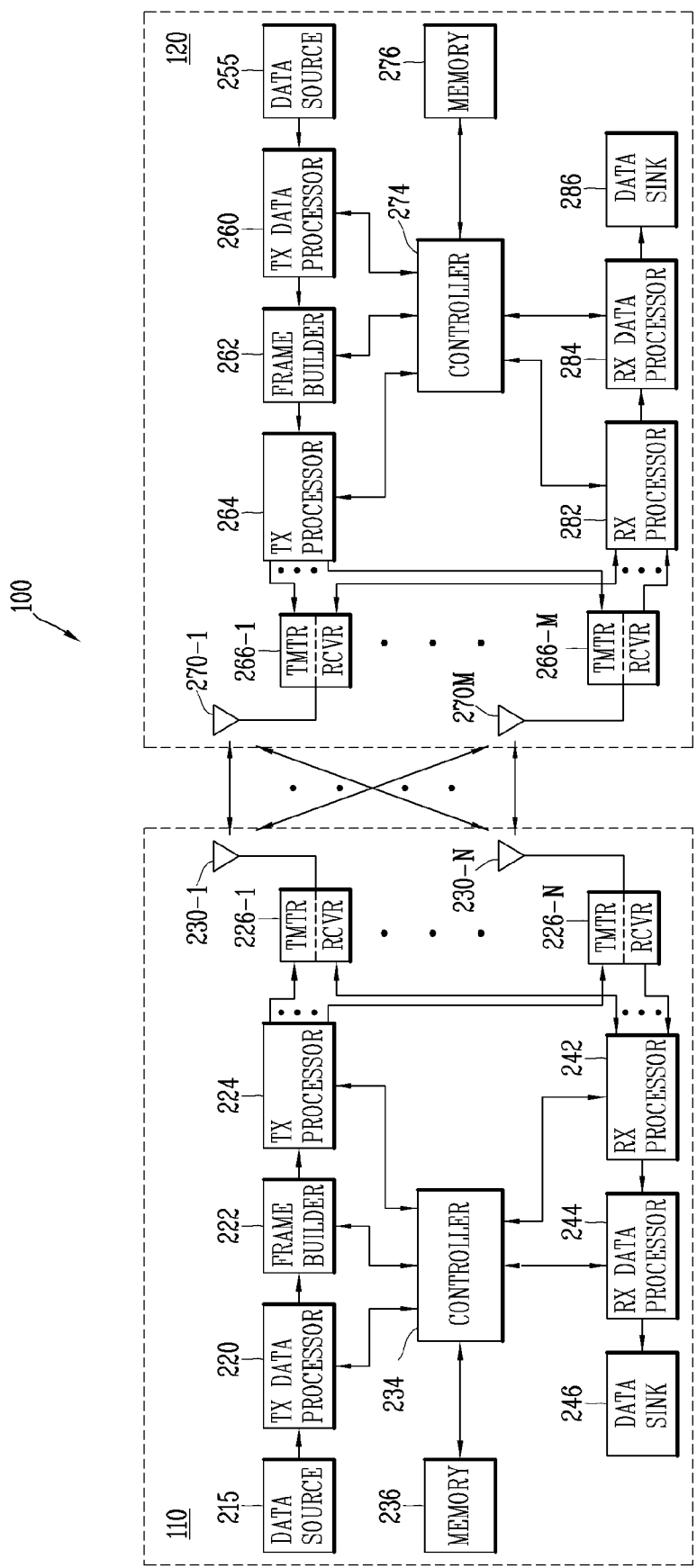
FIG. 2 illustrates a detailed configuration of electronic devices configured to support a wireless interface according to the present specification.

FIG. 2 illustrates a detailed configuration of electronic devices configured to support a wireless interface according to the present specification. FIG. 2 illustrates a block diagram of an access point 110 (generally, a first wireless node) and an access terminal 120 (generally, a second wireless node) in a wireless communication system. The access point 110 is a transmitting entity for a downlink and a receiving entity for an uplink. The access terminal 120 is a transmitting entity for an uplink and a receiving entity for a downlink. As used herein, a "transmitting entity" is an independently operating apparatus or device capable of transmitting data through a wireless channel, and a "receiving entity" is an independently operating apparatus or device capable of receiving data through a wireless channel.

Referring to FIGS. 1 and 2, a set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

To transmit data, the access point 110 includes a TX data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

During operation, the TX data processor 220 receives data (e.g., data bits) from a data source 215, and processes the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16QAM, 64QAM, 64APSK, 128APSK, 256QAM, and 256APSK.

The controller 234 may transmit, to the TX data processor 220, a command for specifying an MCS to be used (e.g., based on channel conditions for a downlink). The TX data processor 220 may encode and modulate the data received from the data source 215 according to the specified MCS. It needs to be recognized that the TX data processor 220 may perform additional processing on the data, such as data scrambling and/or other processing. The TX data processor 220 outputs the data symbols to the frame builder 222.

The frame builder 222 constructs a frame (also referred to as a packet) and inserts the data symbols into a data payload of the frame. The frame may include a preamble, a header, and a data payload. The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on a downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on an uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, a transceiver 266-1 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit board. To do so, among the antennas 270-1 to 270-M, an antenna configured to operate with vertical polarization may be vertically arranged inside the multi-layer circuit board.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE) sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, stores the recovered data (e.g., data bits), and/or outputs the recovered data to a data sink 246 for additional processing.

The access terminal 120 may transmit the data using an orthogonal frequency-division multiplexing (OFDM) transmission mode or an single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on the multi-layer circuit board. To do so, among the antennas 230-1 to 230-M, an antenna configured to operate with vertical polarization may be vertically arranged inside the multi-layer circuit board.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
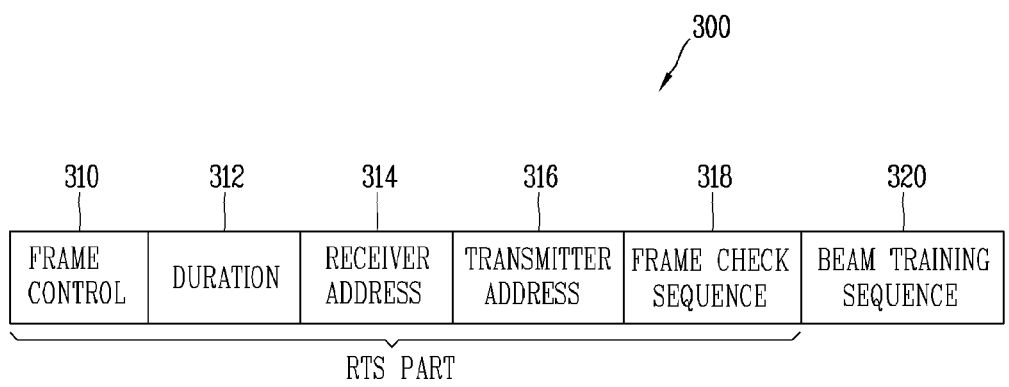
FIG. 3A illustrates a request to send frame (RTS) and a clear to send (CTS) frame according to the present specification.
Figure 3A:
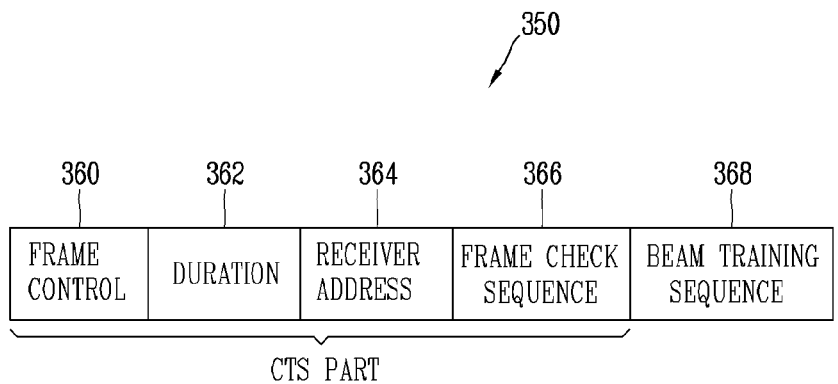

The electronic device supporting the 802.11ay wireless interface described herein determines whether a communication medium may be used to communicate with another electronic device. To do so, the electronic device transmits a request to send (RTS)-TRN frame including an RTS part and a first beam training sequence. In relation to this, FIG. 3A illustrates an RTS frame and a clear to send (CTS) frame according to the present specification. In relation to this, a transmission device may use the RTA frame to determine whether a communication medium may be used to transmit one or more data frames to a destination device. In a response to receiving the RTS frame, the destination device transmits the CTS frame back to the transmission device when the communication medium may be used. In a response to receiving the CTS frame, the transmission device transmits one or more data frames to the destination device. In a response to successfully receiving the one or more data frames, the destination device transmits one or more acknowledgment ("ACK") frames to the transmission device.

Referring to (a) of FIG. 3A, a frame 300 includes the RTS part including a frame control field 310, a duration field 312, a receiver address field 314, a transmitter address field 316, and a frame check sequence field 318. To improve communication and reduce interference, the frame 300 further includes a beam training sequence field 320 for configuring respective antennas of the destination device and one or more neighboring devices.

Referring to (b) of FIG. 3A, a CTS frame 350 includes an CTS part containing a frame control field 360, a duration field 362, a receiver address field 364, and a frame check sequence field 366. To improve communication and reduce interference, a frame, i.e., is the CTS frame 350 further includes a beam training sequence field 368 for configuring respective antennas of the destination device and one or more neighboring devices.

The beam training sequence fields 320 and 368 may conform to a training (TRN) sequence according to the IEEE 802.11ad or 802.11ay standard. The transmission device may use the beam training sequence field 368 to configure an antenna of the transmission device for directional transmission to the destination device. The transmission device may use the beam training sequence field to configure respective antennas of the transmission and destination devices to prevent transmission interference at the destination device. In this case, the beam training sequence field may be used to configure respective antennas of the transmission and destination devices to generate an antenna radiation pattern with nulls targeting the destination device.

Figure 3B:
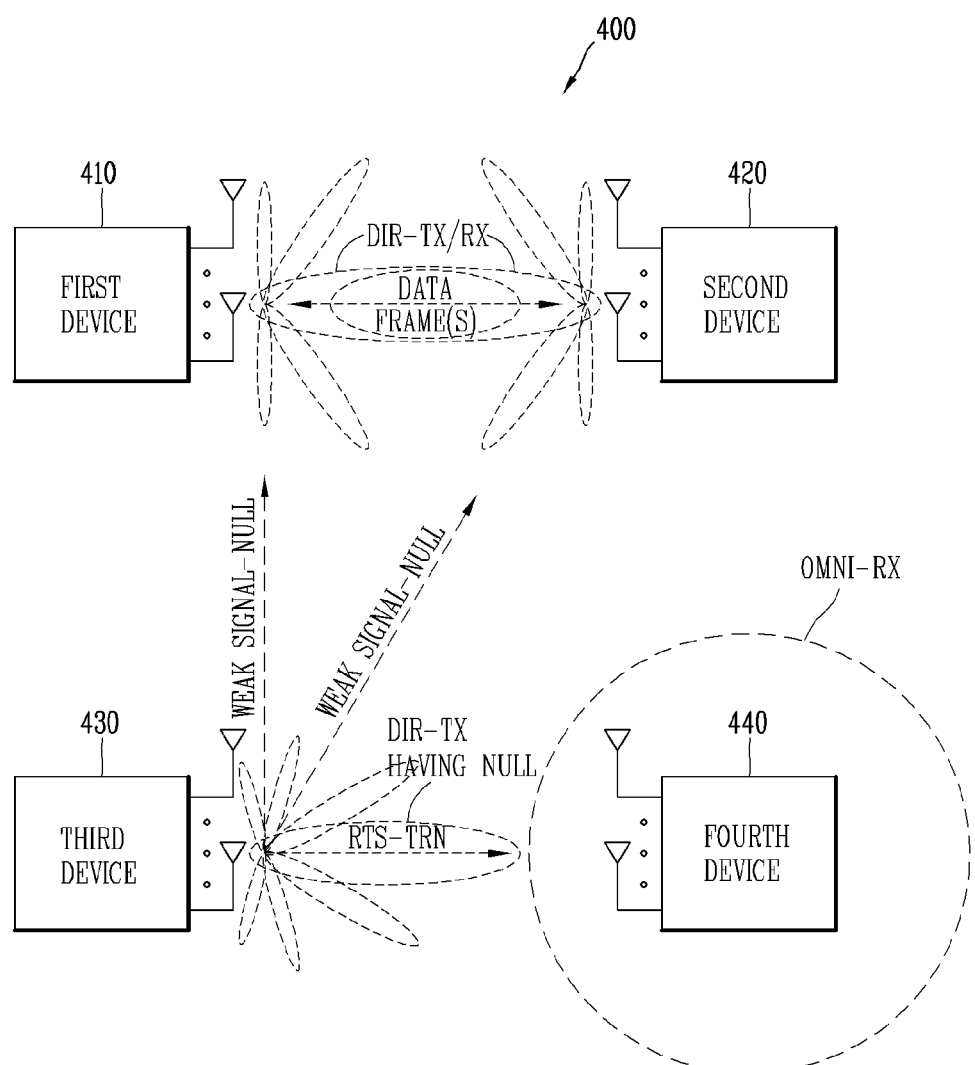
FIG. 3B illustrates a block diagram of a communication system 400 according to an example of the present specification.

Accordingly, electronic devices supporting the 802.11ay wireless interface may provide an initial beam to have a low interference level with each other, using a beamforming pattern determined according to a beam training sequence. In relation to this, FIG. 3B illustrates a block diagram of a communication system 400 according to an example of the present specification. As illustrated in FIG. 3B, the first and second devices 410 and 420 may improve communication performance by matching directions of main beams with each other. To reduce interference with a third device 430, the first and second devices 410 and 420 may provide a signal-null having a weak signal strength in a specific direction.

In relation to the provision of the main beams and the signal-null, a plurality of electronic devices described herein may be configured to perform beamforming through an array antenna. Referring to FIG. 3B, some of the electronic devices may be configured to communicate with an array antenna of another electronic device through a single antenna. In relation to this, when communicating through a single antenna, a beam pattern is provided as an omnidirectional pattern.

FIG. 3B illustrates that the first to third devices 410 to 430 perform beamforming and a fourth device 440 does not perform beamforming. However, performance of beamforming is not limited thereto. Accordingly, three of the first to fourth devices 410 제 440 may be configured to perform beamforming, and the other may be configured not to perform beamforming.

As another example, only one of the first to fourth devices 410 may be configured to perform beamforming, and the other three devices may be configured not to perform beamforming. As another example, two of the first to fourth devices 410 may be configured to perform beamforming but the other two may be configured not to perform beamforming. As another example, all of the first to fourth devices 410 may be configured to perform beamforming.

Referring to FIGS. 3A and 3B, the first device 410 determines that the first device 410 is an intended receiving device for the CTS-TRN frame 350, i.e., the CTS frame, based on an address indicated in the receiver address field 364 of the CTS-TRN frame 350. In response to the determining as being the intended receiving device for the CTS-TRN frame 350, the first device 410 may selectively use a beam training sequence in the beam training sequence field 368 of the CTS-TRN frame 350 received to configure an antenna of the first device 410 for directional transmission substantially targeting the second device 420. That is, the antenna of the first device 410 is configured to generate an antenna radiation pattern having a primary lobe (e.g., a highest gain lobe) substantially targeting the second device 420 and non-primary lobes targeting other directions.

The second device 420 is already aware of a direction toward the first device 410 on a basis of the beam training sequence of the beam training sequence field 320 in the frame 300, i.e., an RTS-TRN frame previously received by the second device 420. Thus, the second device 420 may configure an antenna of the second device 420 for directional reception selectively targeting the first device 410 (e.g., a primary antenna radiation lobe). Therefore, while the antenna of the first device 410 is configured for the directional transmission to the second device 420 and the antenna of the second device 420 is configured for the directional reception from the first device 410, the first device 410 transmits one or more data frames to the second device 420. Accordingly, the first and second devices 410 and 420 perform directional transmission/reception DIR-TX/RX of one or more data frames through the primary lobe (the main beam).

The first and second devices 410 and 420 may partially modify a beam due to an antenna radiation pattern having non-primary lobes.

In relation to this, the third device 430 determines that the third device 430 is not the intended receiving device for the CTS-TRN frame 350 on a basis of an address indicated in the receiver address field 364 of the CTS-TRN frame 350. In a response to the determining that third device 430 is not the intended receiving device for the CTS-TRN frame 350, the third device 430 uses the beam training sequence in the beam training sequence field 368 of the received CTS-TRN 350 and a sequence of the beam training sequence field 320 in the RTS-TRN frame 300 previously received, to configure the antenna of the third device 430 to generate antenna radiation patterns having nulls substantially targeting the second device 420 and the first device 410, respectively. The nulls may be based on an estimated angle of arrival of the RTS-TRN frame 300 previously received, and the CTS-TRN frame 350. In general, the third device 430 generates antenna radiation patterns having desired signal powers, rejections or gains targeting the first device 410 and the second device 420, respectively (for example, to achieve an estimated interference in the first and second devices 410 and 420 to be equal to or less than a defined threshold (e.g., to acquire desired BER, SNR, SINR and/or other one or more communication properties)).

The third device 430 may configure an antenna transmission radiation pattern of the third device 430 by estimating antenna gains in directions toward the first and second devices 410 and 420, estimating antenna reciprocity differences between the third device 430 and the first and second devices 410 and 420 (e.g., a transmission antenna gain minus a reception antenna gain), and respectively calculating the antenna gains and the antenna reciprocity differences throughout one or more sectors to determine estimated interferences corresponding to the first and second devices 410 and 420.

The third device 430 transmits the RTS-TRN frame 300 intended for the fourth device 440 and to be received by the fourth device 440. As long as the first and second devices 410 and 420 perform communication on a basis of durations indicated in the duration fields 312 and 362 of the RTS-TRN frame 300 and the CTS-TRN frame 350, respectively, the third device 430 maintains an antenna configuration having nulls intended for the first and second devices 410 and 420. Since the antenna of the third device 430 is configured to generate nulls targeting the first device 410 and the second device 420, transmission of the RTS-TRN frame 300 by the third device 430 may generate reduced interference in the first device 410 and the second device 420, respectively.

Accordingly, the electronic devices supporting the 802.11ay wireless interface disclosed herein may provide a signal null direction in a specific direction to reduce interference while matching main beam directions with each other using an array antenna. To do so, a plurality of the electronic devices may provide an initial beam direction through a beam training sequence and change a beam direction through a periodically updated beam training sequence.

As described above, for high-speed data communication between the electronic devices, beam directions should be configured to match each other. In addition, a loss of a radio signal transmitted to an antenna element needs to be minimized for high-speed data communication. To do so, an array antenna needs to be arranged in a multi-layer substrate on which a radio frequency integrated chip (RFIC) is arranged. In addition, for radiation efficiency, the array antenna needs to be arranged adjacent to a side region in the multi-layer substrate.

In addition, in order to adapt to a change in a wireless environment, a beam training sequence between the electronic devices needs to be updated. To update the beam training sequence, the RFIC needs to periodically transceive signals with a processor such as a modem. Therefore, to minimize update delay time, transception of a control signal between the RFIC and the modem needs to be performed within short time. To do so, a physical length of a connection path between the RFIC and the modem needs to be reduced. To do so, the modem may be arranged on a multi-layer substrate on which the array antenna and the RFIC are arranged. Alternatively, in a structure in which the array antenna and the RFIC are arranged on the multi-layer substrate and the modem is arranged on a main substrate, a connection length between the RFIC and the modem may be configured to be minimized. In relation to this, a detailed structure is described with reference to FIG. 5C.

Figure 4:
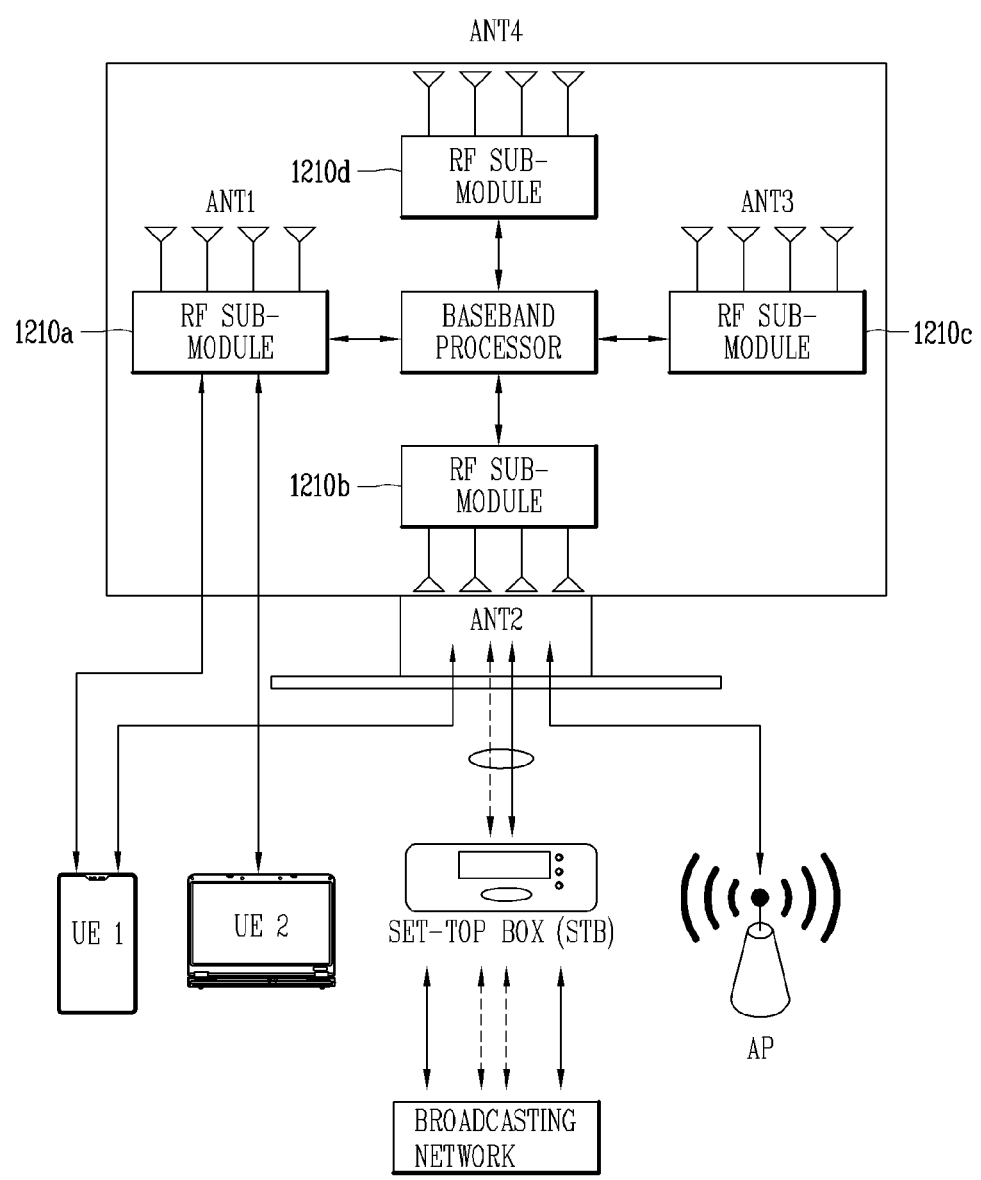
FIG. 4 illustrates an electronic device in which a plurality of antenna modules and a plurality of transceiver circuits are arranged, according to an embodiment.

Hereinafter, an electronic device having an antenna operable in a mmWave band will be described. In relation to this, FIG. 4 illustrates an electronic device in which a plurality of antenna modules and a plurality of transceiver circuits are arranged. Referring to FIG. 4, a home appliance in which the antenna modules and the transceiver circuit modules are arranged may be a television, but is not limited thereto. Accordingly, in the present specification, the home appliance in which the antenna modules and the transceiver circuit modules are arranged may include any home appliance or a display device configured to support a communication service in a millimeter wave band.

Referring to FIG. 4, an electronic device 1000 includes a plurality of antenna modules ANT1 to ANT4 and a plurality of transceiver circuit modules 1210*a* to 1210*d*. In relation to this, the transceiver circuit modules 1210*a* to 1210*d* may correspond to a transceiver circuit 1250 described above. Alternatively, the transceiver circuit modules 1210*a* to 1210*d* may be a partial configuration of the transceiver circuit 1250 or a partial configuration of a front-end module arranged between the antenna modules ANT1 to ANT4 and the transceiver circuit 1250.

The antenna modules ANT1 to ANT4 may be configured as an array antenna in which a plurality of antenna elements are arranged. A number of the antenna elements of the antenna modules ANT1 to ANT4 is not limited to two, three, four, or the like as illustrated in the drawing. For example, the number of the antenna elements of the antenna modules ANT1 to ANT4 may extend to 2, 4, 8, 16, or the like. In addition, the antenna elements of the antenna modules ANT1 to ANT4 may be selected in a same number or in different numbers. The plurality of antenna modules ANT1 to ANT4 may be arranged in different areas in a display, or in a lower portion or on a side surface of the electronic device. The plurality of antenna modules ANT1 to ANT4 may be arranged in an upper portion, a left portion, a lower portion, or a side portion of the display. However, an arrangement structure thereof is not limited thereto. As another example, the antenna modules ANT1 to ANT4 may be arranged in an upper left portion, an upper right portion, a lower left portion, or a lower right portion of the display.

The antenna modules ANT1 to ANT4 may be configured to transmit or receive a signal in a specific direction in any frequency band. For example, the antenna modules ANT1 to ANT4 may operate in any one of a 28 GHz band, a 39 GHz band, and a 64 GHz band.

The electronic device may maintain a connection state with a different entity through two or more of the antenna modules ANT1 to ANT4 including first to fourth antenna modules, or perform a data transmitting or receiving operation to maintain the connections state described above. In relation to this, the electronic device corresponding to a display device may transmit or receive data with a first entity through the first antenna module ANT1. Also, the electronic device may transmit or receive data with a second entity through the second antenna module ANT2. As an example, the electronic device may transmit or receive data with a mobile terminal UE through the first antenna module ANT1. The electronic device may transmit or receive data with a control device such as a set-top box or an access point (AP) through the second antenna module ANT2.

Data may be transmitted or received with another entity through other antenna modules, e.g., the third antenna module ANT3 and the fourth antenna module ANT4. As another example, dual connection or MIMO may be performed through at least one of the first and second entities both previously connected via the third antenna module ANT3 and the fourth antenna module ANT4.

Mobile terminals UE1 and UE2 may be arranged on a front surface area of the electronic device, and configured to communicate with the first antenna module ANT1. The set-top box (STB) or the access point AP may be arranged in a lower portion of the electronic device, and configured to communicate with the second antenna module ANT2, but is not limited thereto. As another example, the second antenna module ANT2 may include both a first antenna radiating toward a lower region and a second antenna radiating toward a front region. Accordingly, the second antenna module ANT2 may communicate with the set-top box (STB) or the access point AP through the first antenna, and with one of the mobile terminals UE1 and UE2 through the second antenna.

One of the mobile terminals UE1 and UE2 may be configured to perform MIMO with the electronic device. As an example, the mobile terminal UE1 may be configured to perform MIMO while performing beamforming with the electronic device. As described above, the electronic device corresponding to the image display device may perform high-speed communication with another electronic device or the set-top box STB through a WiFi wireless interface. As an example, the electronic device may perform high-speed communication in a 60 GHz band with another electronic device or the set-top box STB through the 802.11ay wireless interface.

The transceiver circuit modules 1210*a* to 1210*d* may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210*a* to 1210*d* may be referred to as RF sub-modules 1210*a* to 1210*d*. In this case, a number of the RF sub-modules 1210*a* to 1210*d* is not limited to four, and may be changed to an arbitrary number of two or more according to applications.

In addition, the RF sub-modules 1210*a* to 1210*d* may include an up-conversion module and a down-conversion module both configured to convert a signal in the RF frequency band into a signal of in an IF (intermediate frequency) band or convert a signal in the IF frequency band into a signal in the RF frequency band. To this end, the up-conversion module and the down-conversion module may include a local oscillator (LO) capable of performing up-frequency conversion and down-frequency conversion.

With respect to the plurality of RF sub-modules 1210a to 1210d, a signal may be transmitted from one of the transceiver circuit modules 1210a to 1210d to another transceiver circuit module adjacent thereto. Accordingly, a configuration may be such that the signal is transmitted to all of the transceiver circuit modules 1210a to 1210d at least once.

To do so, a data transfer path having a loop structure may be added. In relation to this, through a transmission path P2 having the loop structure, the RF sub-modules 1210b and 1210c adjacent to each other may bidirectionally transmit a signal.

Alternatively, a data transfer path having a feedback structure may be added. In relation to this, through the data transfer path having the feedback structure, at least one sub-module, that is, the sub-module 1210c may transmit a signal to the remaining sub-modules 1210a, 1210b, and 1210d unidirectionally.

The plurality of RF sub-modules may include the first to fourth RF sub-modules 1210a to 1210d. In relation to this, a signal from the first RF sub-module 1210a may be transmitted to the RF sub-module 1210b and the fourth RF sub-module 1210d both adjacent thereto. In addition, the second RF sub-module 1210b and the fourth RF sub-module 1210d may transmit the signal to the third RF sub-module 1210c adjacent thereto. In this case, when bidirectional transmission between the second RF sub-module 1210b and the third RF sub-module 1210c may be performed as shown in FIG. 4, this may be referred to as a loop structure. On the other hand, when only omnidirectional transmission may be performed between the second RF sub-module 1210b and the third RF sub-module 1210c, this may be referred to as a feedback structure. In the feedback structure, at least two signals may be transmitted to the third RF sub-module 1210c.

However, structures are not limited thereto, and a baseband module may be included only in a specific module among the first to fourth RF sub-modules 1210a to 1210d depending on applications. Alternatively, depending on applications, the baseband module may not be included in the first to fourth RF sub-modules 1210a to 1210d, but may be configured as a separate control unit, that is, a baseband processor 1400. For example, a control signal may be transmitted only by a separate control unit, that is, the baseband processor 1400.

Hereinafter, with respect to the electronic device illustrated in FIG. 1 and including the wireless interface of FIG. 2, a specific configuration and function are described. Transmission or reception of data between electronic devices needs to be performed using a communication service in a mmWave band therebetween. In relation to this, a wireless audio-video (AV) service and/or high-speed data transmission may be provided using the 802.11ay wireless interface as a mmWave wireless interface. This is not limited to the 802.11ay wireless interface, and any wireless interface of a 60 GHz band may be adopted. In relation to this, a 5G or 6G wireless interface using a 28 GHz band or a 60 GHz band may be used for high-speed data transmission between electronic devices.

There is such a problem that there is no specific solution for an antenna and an RFIC configured to provide a wireless interface in an electronic device such as an image display device, in order to transmit an image with a resolution of 4K or higher. In particular, transmitting or receiving wireless AV data with another electronic device needs to be performed by taking into account a situation in which an electronic device such as an image display device is arranged on a wall of a building or on a table. To do so, it is needed to present a specific configuration with respect to an area of the image display device, in which the antenna and the RFIC are to be arranged, and a structure of the antenna.

Figure 5A:
FIG. 5A illustrates a configuration in which a multi-layer circuit substrate in which an array antenna module is arranged is connected to a radio frequency integrated chip (RFIC), in relation to the present specification.
Figure 5A:
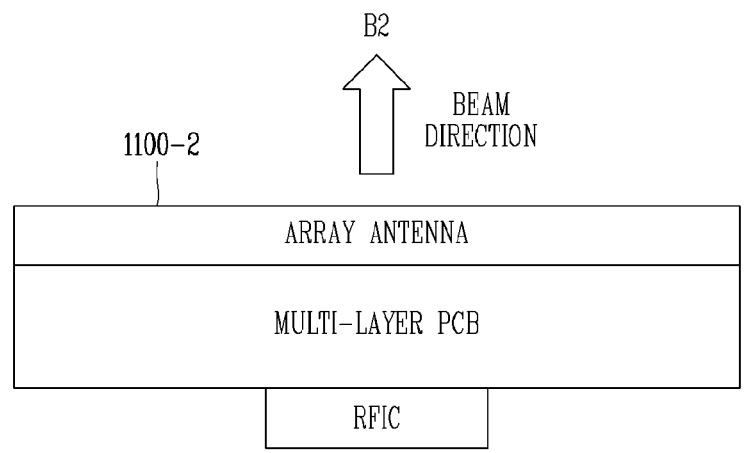

In relation to this, FIG. 5A illustrates a configuration in which a multi-layer circuit substrate in which an array antenna module is arranged is connected to an RFIC, in relation to the present specification. Specifically, in relation to the present specification, a structure of an AIP (antenna in package) module and an antenna module structure implemented on a flexible substrate are illustrated.

Referring to (a) of FIG. 5A, the AIP module is configured as an RFIC-PCB-antenna integrated type for mmWave band communication. In relation to this, an array antenna module 1100-1 may be configured integrally a multi-layer PCB, that is, a multi-layer substrate as illustrated in (a) of FIG. 5A. Accordingly, the array antenna module 1100-1 configured integrally with the multi-layer PCB may be referred to as an AIP module. Specifically, the array antenna module 1100-1 may be arranged in one side area of the multi-layer substrate. In relation to this, a first beam B1 may be provided in a side area of the multi-layer substrate using the array antenna module 1100-1 arranged on one side area of the multi-layer substrate.

On the other hand, referring to (b) of FIG. 5A, an array antenna module 1100-2 may be arranged on the multi-layer substrate. The arrangement of the array antenna module 1100-2 is not limited to the structure of (b) of FIG. 5A, but may be arranged on any layer in the multi-layer substrate. In relation to this, a second beam B2 may be provided in a front surface region of the multi-layer substrate using the array antenna module 1100-2 arranged on any layer of the multi-layer substrate. In relation to this, in a case of the AIP module in which the array antenna module is provided integrally, an array antenna may be arranged on a same PCB as the RFIC to minimize a distance between the RFIC and the antenna.

The antenna of the AIP module may be implemented using a multi-layer PCB manufacturing process, and radiate a signal in a vertical/side direction of the PCB. In relation to this, double polarization may be implemented using a patch antenna or a dipole/monopole antenna. Accordingly, the first array antenna 1100-1 shown in (a) of FIG. 5A may be arranged on the side area of the multi-layer substrate, and the second array antenna 1100-2 shown in (b) of FIG. 5A may be arranged on the side area of the multi-layer board. Therefore, the first beam B1 may be generated through the first array antenna 1100-1, and the second beam B2 may be generated through the second array antenna 1100-2.

The first array antenna 1100-1 and the second array antenna 1100-2 may be configured to have same polarization. Alternatively, the first array antenna 1100-1 and the second array antenna 1100-2 may be configured to have orthogonal polarization. In relation to this, the first array antenna 1100-1 may operate as a vertically polarized antenna and also operate as a horizontally polarized antenna. For example, the first array antenna 1100-1 may be a monopole antenna having vertical polarization, and the second array antenna may be a patch antenna having horizontal polarization.

Figure 5B:
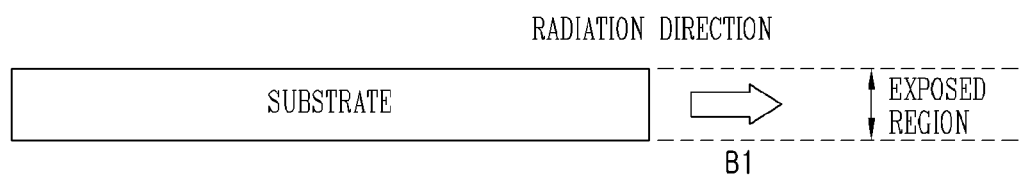
FIG. 5B is a conceptual diagram illustrating antenna structures having different radiation directions.
Figure 5B:
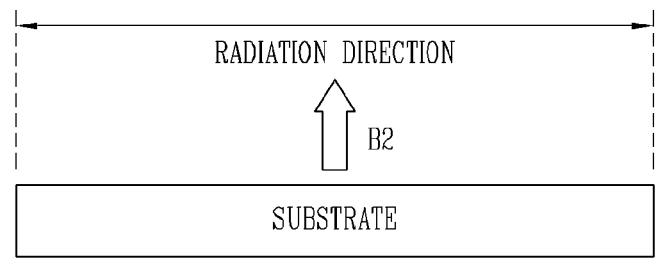

FIG. 5B is a conceptual diagram illustrating antenna structures having different radiation directions.

Referring to (a) of FIG. 5A and (a) of FIG. 5B, a radiation direction of the antenna module arranged in the side area of the multi-layer substrate corresponds to a side direction. In relation to this, the antenna implemented on the flexible substrate may be configured as a radiating element such as a dipole/monopole antenna. That is, antennas implemented on the flexible substrate may be end-fire antenna elements.

In relation to this. end-fire radiation may be implemented by an antenna radiating in a horizontal direction with the substrate. The end-fire antenna may be implemented as a dipole/monopole antenna, a Yagi-dipole antenna, a Vivaldi antenna, a substrate integrated waveguide (SIW) horn antenna, or the like. In relation to this, the Yagi-dipole antenna and the Vivaldi antenna have horizontal polarization characteristics. One of the antenna modules arranged in the image display device described herein needs a vertical polarization antenna. Accordingly, there is a need to present an antenna structure capable of minimizing an antenna exposure area while operating as a vertically polarized antenna.

Referring to (b) of FIG. 5A and (a) of FIG. 5B, a radiation direction of the antenna module arranged in the front area of the multi-layer substrate corresponds to a front direction. In relation to this, an antenna implemented on the AIP substrate may be configured as a radiating element such as a patch antenna. That is, the antenna arranged in the AIP module may be a broadside antenna element radiating in the broadside direction.

Figure 5C:
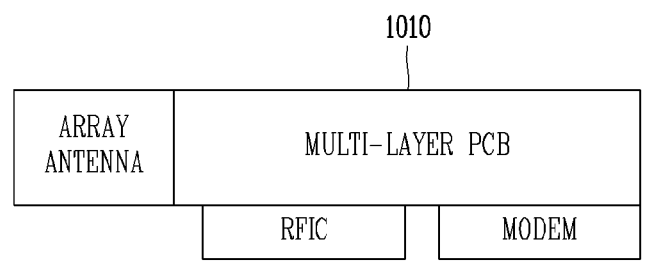
FIG. 5C illustrates a combination structure between a multi-layer substrate and a main substrate according to embodiments.
Figure 5C:
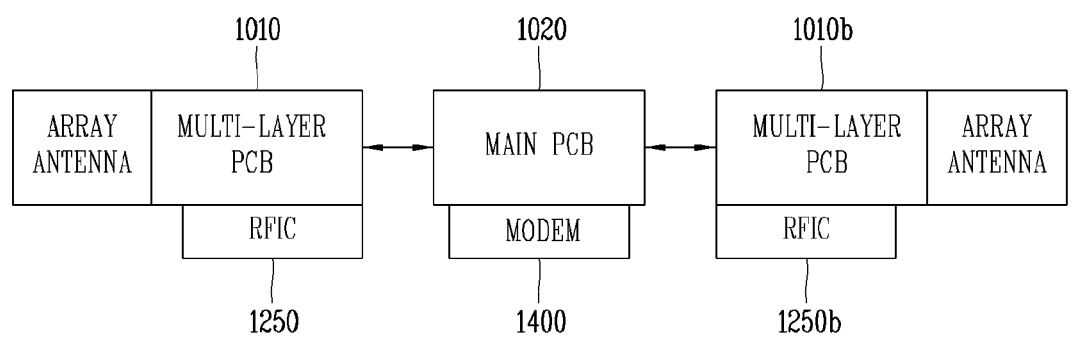

The multi-layer substrate in which the array antenna is arranged may be provided integrally with the main substrate or may be configured to be coupled to the main substrate as a modular type by a connector. In relation to this, FIG. 5C illustrates a combination structure between a multi-layer substrate and a main substrate. Referring to (a) of FIG. 5C, a structure in which an RFIC 1250 and a modem 1400 are integrally provided on a multi-layer substrate 1010 is shown. The modem 1400 may be referred to as the baseband processor 1400. Accordingly, the multi-layer substrate 1010 is integrally provided integrally with the main substrate. The integrated structure may be applied to a structure in which only one array antenna module is arranged in the electronic device.

On the other hand, the multi-layer board 1010 and the main board 1020 may be configured to be coupled to each other as a modular type by a connector. Referring to (b) of FIG. 5C, in relation to this, the multi-layer substrate 1010 may be configured to interface with the main substrate 1020 through a connector. In this case, the RFIC 1250 may be arranged on the multi-layer substrate 1010, and the modem 1400 may be arranged on the main substrate 1020. Accordingly, the multi-layer substrate 1010 may be provided as a separate substrate with the main substrate 1020 and configured to be coupled through a connector.

Such a modular structure may be applied to a structure in which a plurality of array antenna modules are arranged in the electronic device. Referring to (b) of FIG. 5C, the multi-layer substrate 1010 and a second multi-layer substrate 1010b may be configured to interface with the main substrate 1020 through a connector connection. The modem 1400 arranged on the main substrate 1020 is configured to be electrically coupled to RFICs 1250 and 1250b arranged on the multi-layer substrate 1010 and the second multi-layer substrate 1020, respectively.

Figure 6:
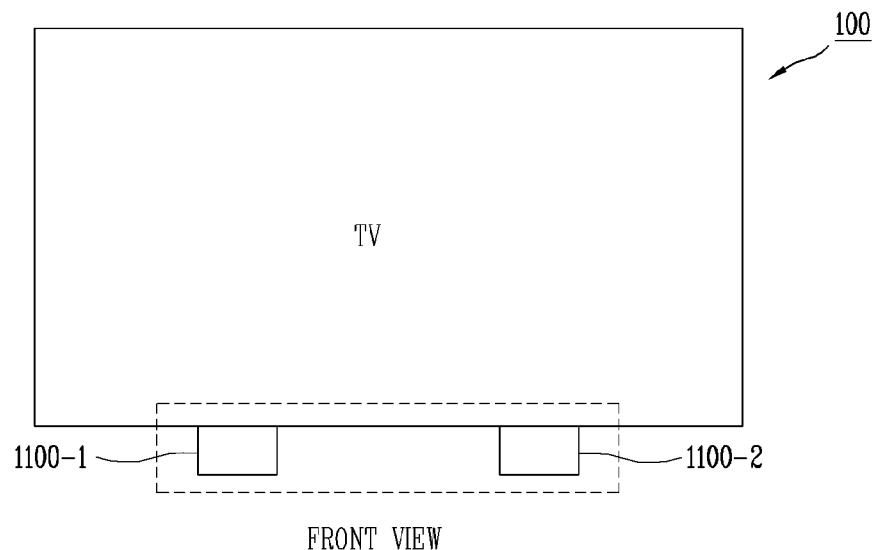
FIG. 6 is a conceptual diagram illustrating a plurality of communication modules arranged in a lower portion of the image display device 100, and communication between the communication modules and other communication modules arranged in a front direction from the image display device.
Figure 6:
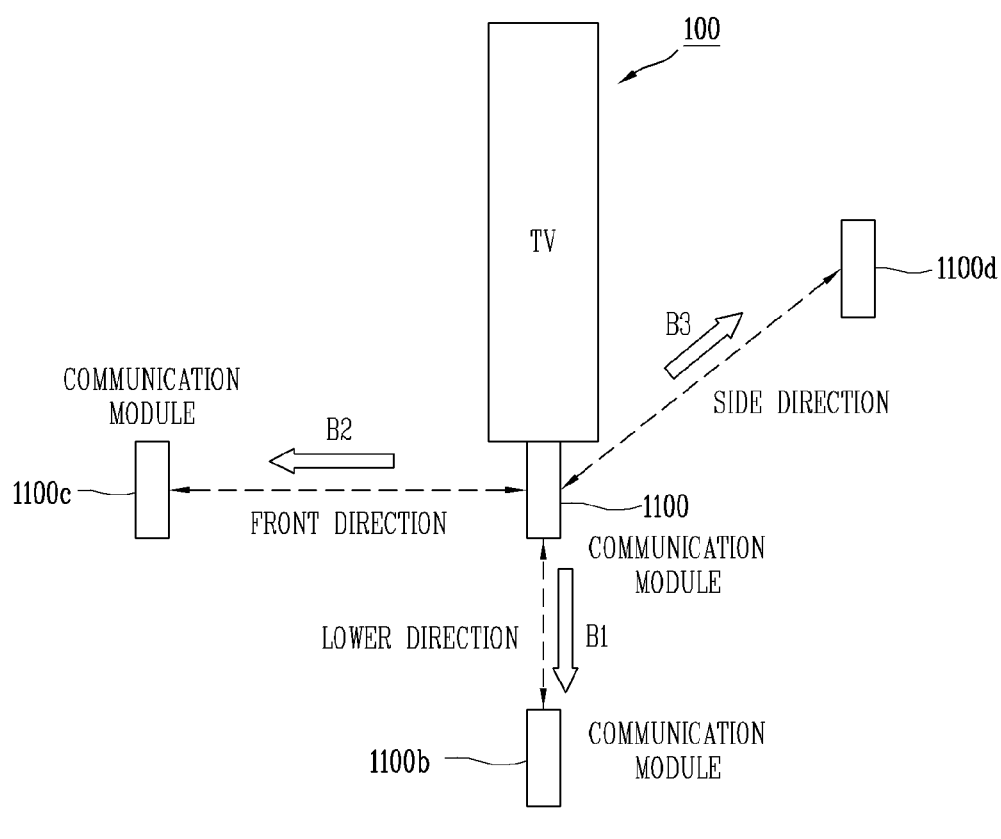

When the AIP module is arranged in a lower portion of the electronic device such as the image display device, communication needs to be performed with other communication modules arranged in a lower direction and a front direction. In relation to this, FIG. 6 is a conceptual diagram illustrating a plurality of communication modules arranged in a lower portion of the image display device 100, and communication between the communication modules and other communication modules arranged in a front direction from the image display device. Referring to (a) of FIG. 6, different communication modules 1100-1 and 1100-2 may be disposed in a lower portion of the image display device 100. Referring to (b) of FIG. 6, the image display device 100 may perform communication with a communication module 1100b arranged below the image display device 100 through the antenna module 1100. Communication may be performed with the second communication module 1100c arranged in front of the image display device 100 through the antenna module 1100 of the image display device 100. In addition, communication may be performed with the third communication module 1100d arranged by a side of the image display device 100 through the antenna module 1100 of the image display device 100.

In relation to this, the communication module 1100b may be a set-top box or an access point (AP) configured to transmit AV data to the image display apparatus 100 through the 802.11ay wireless interface at a high speed, but is limited thereto. The second communication module 1100c may be any electronic device configured to transceive data to/from the image display device 100 at a high speed through the 802.11ay wireless interface. To perform wireless communication with the communication modules 1100b, 1100c, and 1100d arranged in front of, below, and by a side of the image display device 100, respectively, the antenna module 1100 having a plurality of array antennas provide beams in different directions. Specifically, the antenna module 1100 may provide beams in a front direction B2, a lower direction B1, and a side direction B3 through different array antennas, respectively.

In the AIP module structure as illustrated in (a) of FIG. 5A, an antenna height may increase according to an RFIC driving circuit and a heat dissipation structure. Also, depending on a type of an antenna that is being used, an antenna height may increase in the AIP module structure as shown in (a) of FIG. 5A. On the other hand, in the antenna module structure implemented in a side area of the multi-layer substrate as illustrated in (b) of FIG. 5A, an antenna in a low-profile shape may be implemented.

With respect to an antenna module that may be implemented as illustrated in FIGS. 1 and 2 and arranged inside or on a side surface of the electronic device of FIGS. 4 and 6, and is illustrated in FIGS. 5A to 5C, a detailed configuration thereof is described.

A communication module including an antenna may be provided so that the electronic device such as the image display device may perform communication with a neighboring electronic device. Recently, as a display area of the image display device is enlarged, an arrangement space of the communication module including the antenna is reduced. Accordingly, there is an increasing need for arranging an antenna in a multi-layer circuit board on which the communication module is implemented.

A WiFi wireless interface may be taken into account, as an interface for a communication service between electronic devices. When using such a WiFi wireless interface, a mmWave band may be used for high-speed data transmission between electronic devices. In particular, high-speed data transmission between electronic devices may be performed using a wireless interface such as the 802.11ay wireless interface.

In relation to this, an array antenna capable of operating in a mmWave band may be mounted in the antenna module. However, electronic components such as an antenna and a transceiver circuit arranged in such an antenna module are configured to be electrically connected to each other. In relation to this, electronic components arranged on different layers may be electrically connected to each other through a multi-layered transmission line, and thus a vertical via structure may be provided.

In a high frequency band such as a mmWave band, there is such a problem that impedance mismatch between transmission lines and a line loss may occur significantly due to the vertical via structure. In addition, when a plurality of antennas are arranged in the multi-layer substrate, a large amount of line loss may occur according to provision of detour paths of transmission lines in order to avoid overlap between the transmission lines.

The present disclosure is directed to solving the aforementioned problems and other drawbacks. The present disclosure is directed to solving the aforementioned problems and other drawbacks. Another aspect of the present disclosure is to provide an antenna module including a multi-layer impedance transformer operating in a millimeter wave band, and an electronic device including the antenna module.

Another aspect of the present disclosure is to solve such a problem that which line loss increases due to the provision of a detour path of a plurality of feeding lines configured to feed a plurality of antenna elements constituting an array antenna in a mmWave band.

Another aspect of the present disclosure is to solve such a problem that impedance mismatch due to vertical vias increases through a multi-layer impedance conversion structure between an RFIC and an antenna element arranged on a PCB having a form of a multi-layer substrate.

Another aspect of the present disclosure is to provide a broadband feeding line structure capable of improving impedance matching characteristics of an antenna element electrically connected to a feeding line inside a PCB having a form of a multi-layer substrate.

Figure 7A:
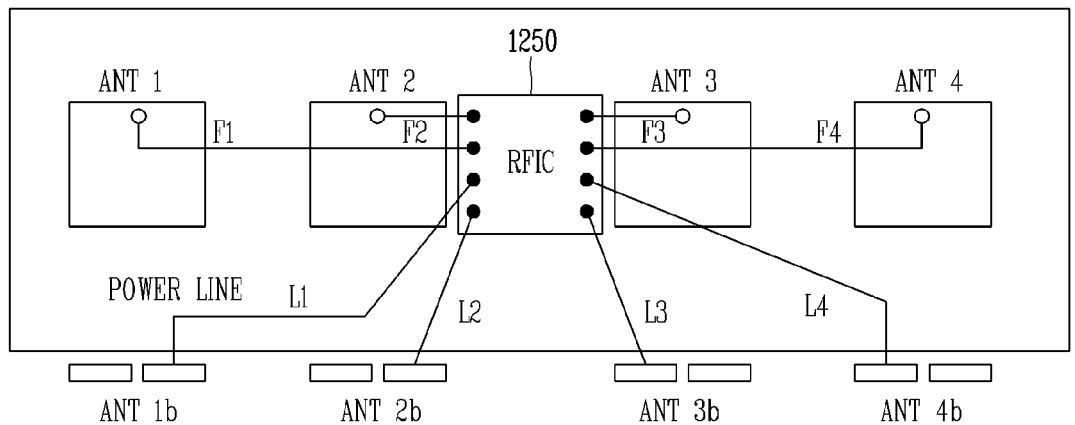
FIGS. 7A and 7B illustrate a comparison between arrangement structures of a radio frequency (RF) line and a power line in a configuration in which RFICs corresponding to transceiver circuits are connected to different antennas.
Figure 7B:
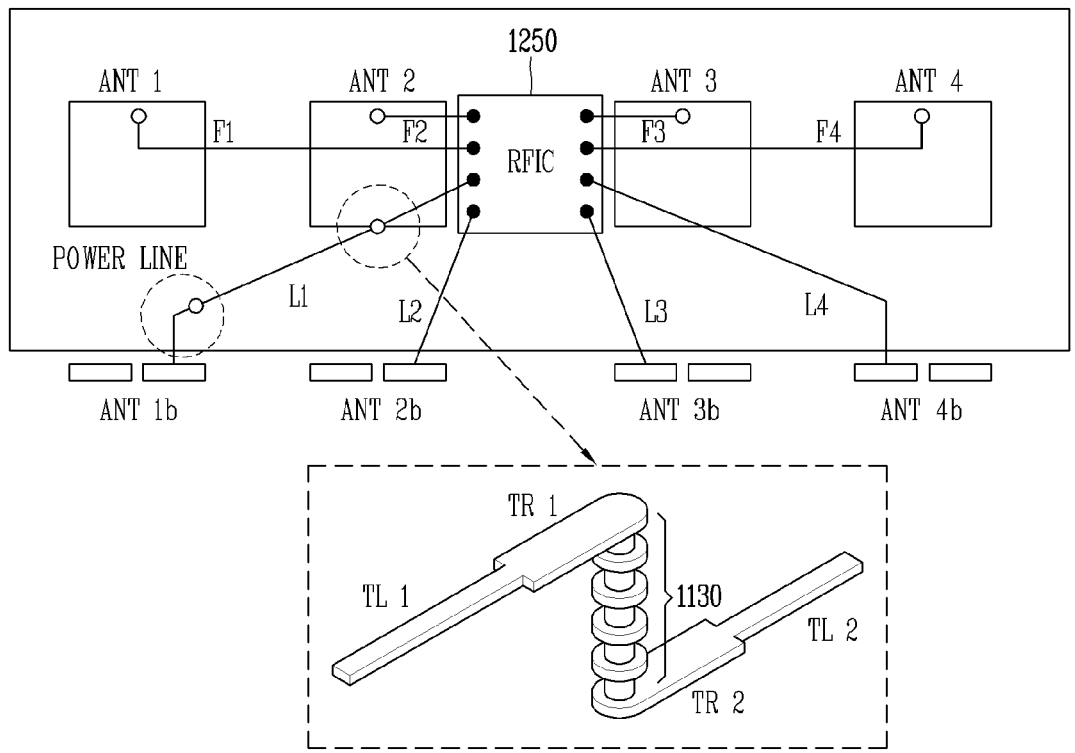

FIGS. 7A and 7B illustrate a comparison between arrangement structures of an RF line and a power line in a configuration in which RFICs corresponding to transceiver circuits are connected to different antennas.

As illustrated in FIG. 7A, when a connection line is provided without a vertical via structure, other RF lines or power lines L1 to L4 may be arranged in paths through which feeding lines F1 to F4 are connected from the RFIC 1250 to the antennas ANT1 to ANT4. In this case, the RF lines or the power lines L1 to L4 need to be configured as detour paths in an area in which the antennas ANT1 to ANT4 are not arranged. For example, the RF line or the power lines L1 to L4 provide detour paths in a form of a horizontal line. In relation to this, a first type of antennas ANT1 to ANT4 may be arranged on the multi-layer substrate or on one layer inside the multi-layer substrate. A second type of antennas ANT1*b* to ANT4*b* may be disposed on a side surface of the multi-layer substrate. The first type of antennas ANT1 to ANT4 may be antennas configured to radiate a signal toward an upper or lower portion of the multi-layered substrate, and the second type of antennas ANT4*b* to ANT4*b* may be antennas configured to radiate a signal toward a side surface of the multi-layered substrate.

On the other hand, as illustrated in FIG. 7B, the RF lines or the power lines L1 to L4 may be arranged through another layer in a region in which the antennas ANT1 to ANT4 are disposed, without having to provide a detour path. Accordingly, by moving to another layer through a vertical via in a vertical line without having to detour along a horizontal line, the RF lines or the power lines L1 to L4 may be provided in a straight line. Accordingly, by shortening a length of the feeding lines F1 to F4 and the RF lines L1 to L4, a line loss may be reduced.

In relation to this, the antennas ANT1 to ANT4 may be the first type of antennas, and the second type of antennas ANT1*b* to ANT4*b* may be arranged in a lower end region. A structure in which impedance transformers TR1 and TR2 are provided to have a vertical via 1130 at a center therebetween may be applied to the feeding lines F1 to F4 connected to the first type antennas ANT1 to ANT4. Also, a structure in which the impedance transformers TR1 and TR2 are provided to have the vertical via 1130 at a center therebetween may be applied to the RF lines L1 to L4 connected to the second type antennas ANT1*b* to ANT4*b*. In relation to this, the first type of antennas ANT1 to ANT4 may be arranged on the multi-layer substrate or on one layer inside the multi-layer substrate. The second type of antennas ANT1*b* to ANT4*b* may be disposed on a side surface of the multi-layer substrate. The first type of antenna may be an antenna configured to radiate a signal toward an upper or lower portion of the multi-layered substrate, and the second type of antenna may be an antenna configured to radiate a signal toward a side surface of the multi-layered substrate.

According to an embodiment described herein, in a line connection structure of FIG. 7B, the impedance transformers TR1 and TR2 in a form of a λ/4 conversion device are provided to have the vertical via 1130 therebetween in the transmission lines TL1 and TL2 arranged in different layers. Accordingly, the feeding lines F1 to F4 may be provided in a straight line in a direction in which the antennas ANT1 to ANT4 are arranged through a via. In this case, performance degradation due to a via may be prevented using a structure in which a width of lines facing each other having the vertical via 1130 at a center therebetween becomes thicker, and then, becomes thinner again.

Figure 8:
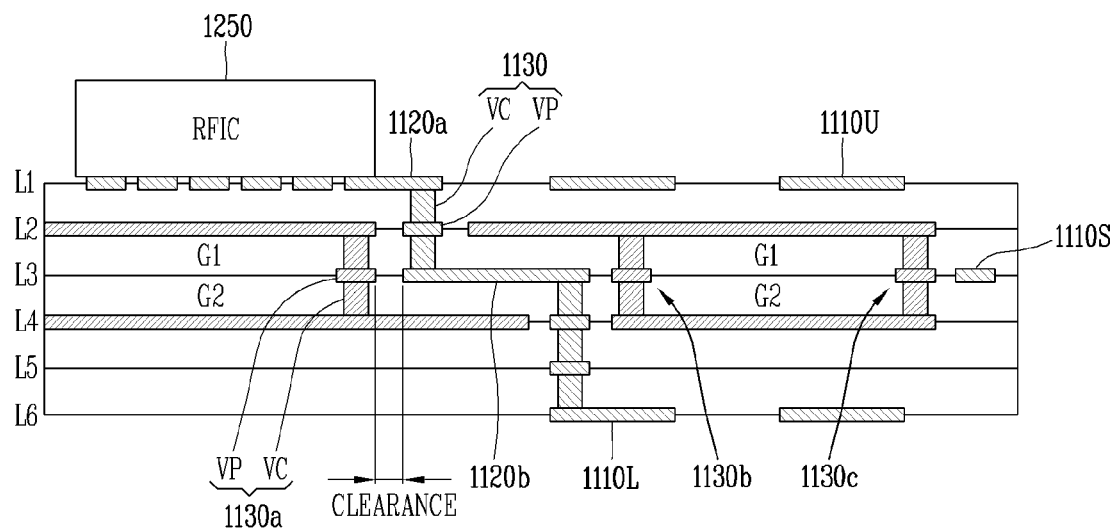
FIG. 8 illustrates a configuration of an antenna module including a multi-layer substrate according to the present specification.

With respect to the antenna module including the multi-layer substrate described herein, an impedance conversion structure in which vertical vias are taken into account is described. FIG. 8 illustrates a configuration of an antenna module including a multi-layer substrate according to the present specification. FIG. 8 is a side view of the antenna module 1100 in a mmWave band capable of increasing a coverage by radiating electromagnetic waves in various directions.

As illustrated in FIG. 8, the antenna module 1100 may be configured to include the transceiver circuit 1250, a first transmission line 1120*a*, a second transmission line 1120*b*, and a vertical via 1130. Since the antenna module 1100 is implemented to include a plurality of multi-layer substrates, the antenna module 1100 may be referred to as an antenna assembly 1100.

The transceiver circuit 1250 may be configured to be arranged on the antenna module 1110 including the multi-layer substrate. The transceiver circuit 1250 may be arranged on an uppermost layer of the multi-layer substrate, but is not limited thereto. Referring to FIG. 8, the multi-layer substrate in a form of a printed circuit board (PCB) includes six layers, but is not limited thereto. The multi-layer substrate may be configured in various numbers of layers depending on an application. An RFIC corresponding to the transceiver circuit 1250 is attached to a multi-layer substrate corresponding to the PCB, and configured to transmit or receive a signal in a mmWave band through antennas 1100U, 1100S, and 1100L. In relation to this, since the antenna 1100U is configured to radiate a signal upwards, the antenna 1100U may be referred to as an upper antenna. In addition, since the antenna 1100L is configured to radiate a signal downwards, the antenna 1100L may be referred to as a lower antenna. Also, since the antenna 1100S is configured to radiate a signal sidewards, the antenna 1100S may be referred to as a side antenna.

The upper antenna 1100U and the lower antenna 1100L may be configured as a first type of radiator to radiate signals in an upper direction and a lower direction that are perpendicular to the multi-layer substrate. The upper antenna 1100O and the lower antenna 1100L may be configured as a first type of antenna for radiating signals in a broadside direction, like a patch antenna. On the other hand, the side antenna 1100S may be configured as a second type of radiator for radiating a signal in a side direction parallel to the multi-layer substrate. The side antenna 1100S may be configured as a second type of antenna for radiating a signal in an end-fire direction, like a dipole antenna or a monopole antenna.

Accordingly, the antenna module 1100 may be configured to include the lower antenna 1100L and the side antenna 1100S arranged inside the multi-layer substrate and configured to radiate a signal in the side direction of the multi-layer substrate. In addition, the antenna module 1100 may be configured to further include the upper antenna 1100U.

To improve directivity of the side antenna 1100S, a ground via wall 1130c may be arranged. In relation to this, as described above, the side antenna 1100S may be arranged inside the multi-layer substrate and configured to radiate signals toward a side direction of the multi-layer substrate. The ground via wall 1130c may include a plurality of layers arranged at a further inner position in the multi-layer substrate compared to the side antenna 1100S to improve directivity, toward a side direction, of a signal radiated by the side antenna 1100S. In other words, the ground via wall 1130c may be configured as a vertical connection portion connecting via pads on first and second grounds G1 and G2 to each other.

The first transmission line 1120a may be arranged on a first layer of the antenna module 1100 and configured to be electrically connected to the transceiver circuit 1250. The second transmission line 1120b may be arranged on a second layer of the antenna module 1100 and configured to be electrically connected to an antenna. Here, the first layer and the second layer are any layers in the multi-layer substrate on which the first transmission line 1120a and the second transmission line 1120b are arranged. As an example, referring to FIG. 8, the first layer may be a first layer L1 that is an uppermost layer, and the second layer may be a third layer L3 inside the multi-layer substrate. Accordingly, the first transmission line 1120a may be arranged on an upper layer of the PCB on which the RFIC 1250 is arranged, or a lower layer of the PCB. The second transmission line 1120b may be arranged on a layer in the PCB, but is not limited thereto. The arrangement of the second transmission line 1120b may vary depending on an application.

A feeding line for connecting the RFIC 1250 to the antennas 1100U, 1100S, and 1100L may be arranged on or inside the multi-layer substrate. As illustrated in FIG. 8, the upper antenna 1100U and the RFIC 1250 are arranged on the uppermost layer of the multi-layer substrate, and thus, may be directly connected to each other without a vertical via connection. Meanwhile, when the upper antenna 1100O is arranged on a layer other than the uppermost layer, for example, the second layer L2, the upper antenna 1100O may be connected to the RFIC 1250 through a vertical via connection.

The lower antenna 1100L may be configured to be connected to the RFIC 1250 using the first transmission line 1120a, the vertical via 1130 and the second transmission line 1120b, described above. The lower antenna 1100L may be configured to be electrically connected to the second transmission line 1120b through a second vertical via 1132. The lower antenna 1100L may be a lower antenna configured to radiate a signal in a lower direction of the antenna module 1100.

A vertical via 1120 may be configured to vertically connect the first transmission line 1120a to the second transmission line 1120b. In this case, the vertical via 1120 may include a via pad VP and a vertical connection part VC to connect the feeding lines on the upper layer and the lower layer, for example, the first transmission line 1120a and the second transmission line 1120b to each other. A distance between one end of the via pad VP and an adjacent ground via 1130a or 1130b may be referred to as a via clearance interval.

The ground vias 1130a and 1130b, i.e., first and second ground vias may be configured to connect different grounds, for example, the first ground G1 and the second ground G2 to each other. The first ground via 1130a may be provided adjacent to one end of the second transmission line 1120b. Also, the second ground via 1130b may be provided adjacent to the other end of the second transmission line 1120b.

The vertical via 1130 including the via pad VP and the vertical connection part VC may be referred to as a signal via or a feed via. An impedance of a feeding line in the mmWave band may be configured to be less than 50 ohms, due to a via tolerance between the ground via 1130b and the feed via 1130 including the via pad VP and the vertical connection part VC, Accordingly, impedance mismatching between the antennas 1100U, 1100S, and 1100L and the RFIC 1250 may occur.

A feeding line corresponding to the first transmission line 1120a may be configured as a microstrip line arranged on the uppermost layer or the lowermost layer of the multi-layer substrate corresponding to the PCB. In this case, even when the feeding line is not arranged on the uppermost layer or lowermost layer of the multi-layer substrate, when a ground is not arranged over or below the feeding line, the feeding line may be regarded as a microstrip line. On the other hand, a feeding line corresponding to the second transmission line 1120b may be configured as a strip line arranged in the multi-layer substrate corresponding to the PCB. As illustrated in FIG. 8, a first ground G1 and a second ground G2 are arranged on and below the second transmission line 1120b, respectively, and thus, the second transmission line 1120b corresponds to a structure of the strip line.

Accordingly, the first transmission line 1120a may be configured as a microstrip line in which an air layer is provided without a dielectric on a conductive line arranged on a dielectric. The second transmission line 1120b may be configured as a strip line in which dielectrics are disposed on and below the conductive line, respectively, and the grounds G1 and G2 are arranged on and below the dielectrics, respectively.

Referring to FIG. 8 with respect to an antenna and a feeding line arrangement structure, patch antennas corresponding to the upper antenna 11000 and the lower antenna 1100D may be arranged on the first layer L1 that is an uppermost layer and the sixth layer L6 that is a lowermost layer, respectively. The first ground G1 operates as a ground of the patch antenna and an upper ground of the second transmission line 1120*b*, and may be arranged on the second layer L2. The second ground G2 operates as a lower ground of the second transmission line 1120*b* and may be arranged on a fourth layer L4.

A feeding line including the second transmission line 1120*b* to feed the lower antenna 1100L may be arranged on the third layer L3. In this case, a restriction may occur in an arrangement space of the feeding line configured to feed the side antenna 1100S arranged on the third layer L3. In particular, when the ground via wall 1130*c* operating as a reflector of the side antenna 1100S is arranged on the second layer (L2) to the fourth layer (L4), a constraint may occur in the arrangement space of the feeding line configured to feed the side antenna 1100S. A plurality of ground vias 1130*a*, 1130*b*, and 1130*c* including the ground via wall 1130*c* may be arranged in the multi-layer substrate.

To relieve such a constraint condition on the arrangement space, the side antenna 1100S, such as a dipole antenna, may be arranged on any of the first to sixth layers L1 to L6. Alternatively, the side antenna 1100S may be arrange on any of the second to fourth layers L2 to L4. In this case, a feeding line configured to feed the side antenna 1100S may be provided through a region in which the ground vias 1130*a*, 1130*b*, and 1130*c* are not provided, and connected to the side antenna 1100S.

An impedance matching structure having a vertical via connection between the transmission lines connecting the RFIC to the antenna disclosed herein is described in detail. In relation to this, FIG. 9 illustrates an impedance matching structure having a vertical via connection between the transmission lines connecting the RFIC to the antenna described herein.

Figure 9:
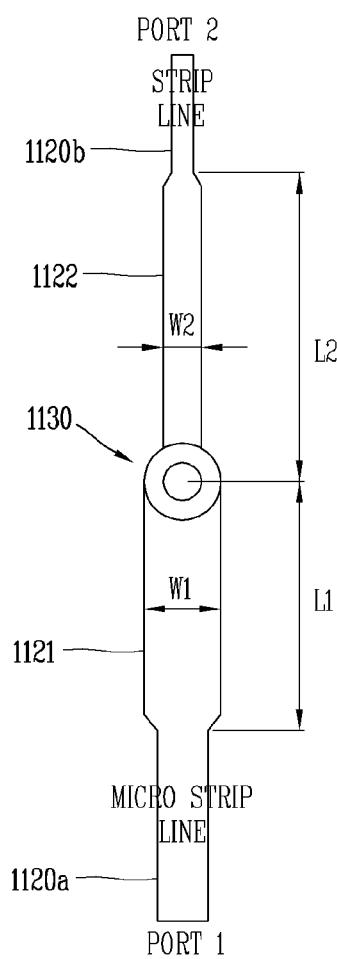
FIG. 9 illustrates an impedance matching structure having a vertical via connection between the transmission lines connecting the RFIC to the antenna disclosed in the present specification.

Referring to FIGS. 8 and 9, a first impedance transformer 1121 in the first transmission line 1120*a* connected to the vertical via 1130 may be configured to have a first width W1 and a first length L1. A second impedance transformer 1122 in the second transmission line 1120*b* connected to the vertical via 1130 may be configured to have a second width W2 and the second length L2.

Figure 10A:
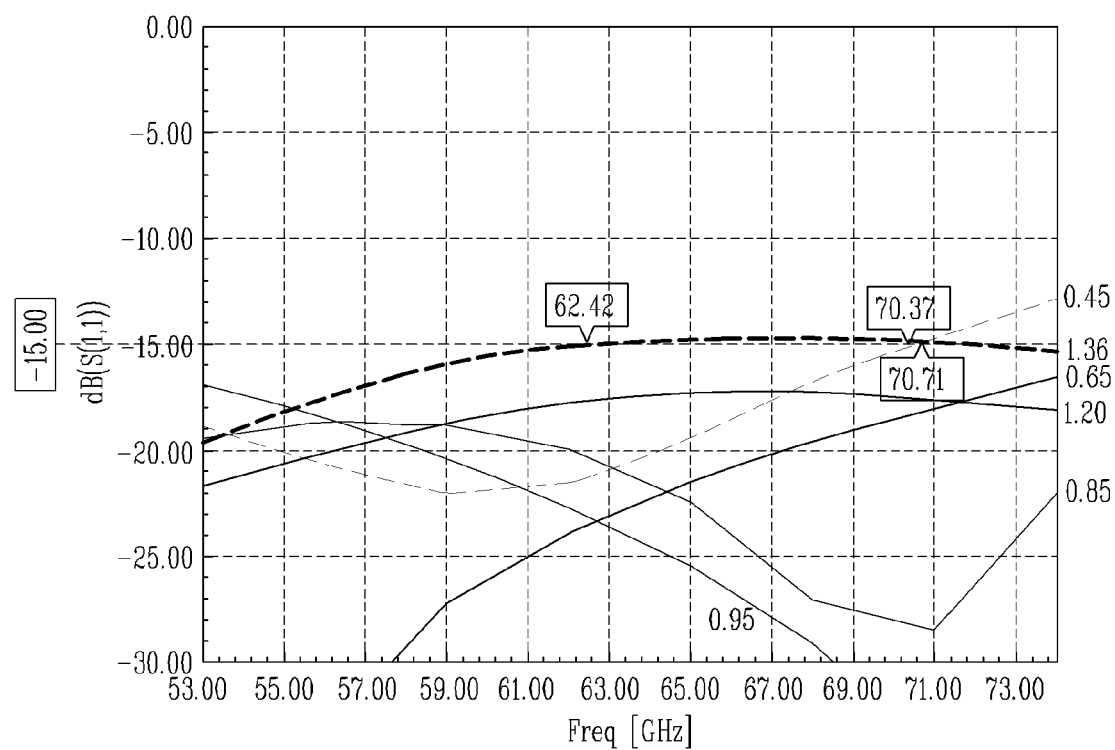
FIG. 10A illustrates reflection coefficient characteristics for each frequency according to a ratio L1/L2 between lengths of first and second impedance transformers. In addition.

In the impedance matching structure disclosed herein, dimensions of the first impedance transformer 1121 and the second impedance transformer 1122 may be set within a predetermined range. In relation to this, FIG. 10A illustrates reflection coefficient characteristics for each frequency according to a ratio L1/L2 between lengths of the first and second impedance transformers 1121 and 1122. In addition, FIG. 10A illustrates reflection coefficient characteristics for each frequency according to a ratio W1/W2 between widths of the first and second impedance transformers 1121 and 1122.

Referring to FIG. 10A, when the ratio L1/L2 between the lengths of the first and second impedance transformers 1121 and 1122 is 0.65, 0.85, or 1.20, this indicates stable reflection loss performance of −15 dB or less in a whole band of 57.2 to 70.2 GHz. However, when the ratio L1/L2 between the lengths of the first and second impedance transformers is 0.45 or 1.35, reflection loss performance has a value of −15 dB or greater in an operating frequency band. Thus, it may be understood that impedance matching performance is attenuated.

Accordingly, referring to FIGS. 8, 9 and 10A, the ratio L1/L2 between the first length L1 of the first impedance transformer 1121 and the second length L2 of the second impedance transformer 1122 may be set to be within a range from 0.45 to 1.35.

Figure 10B:
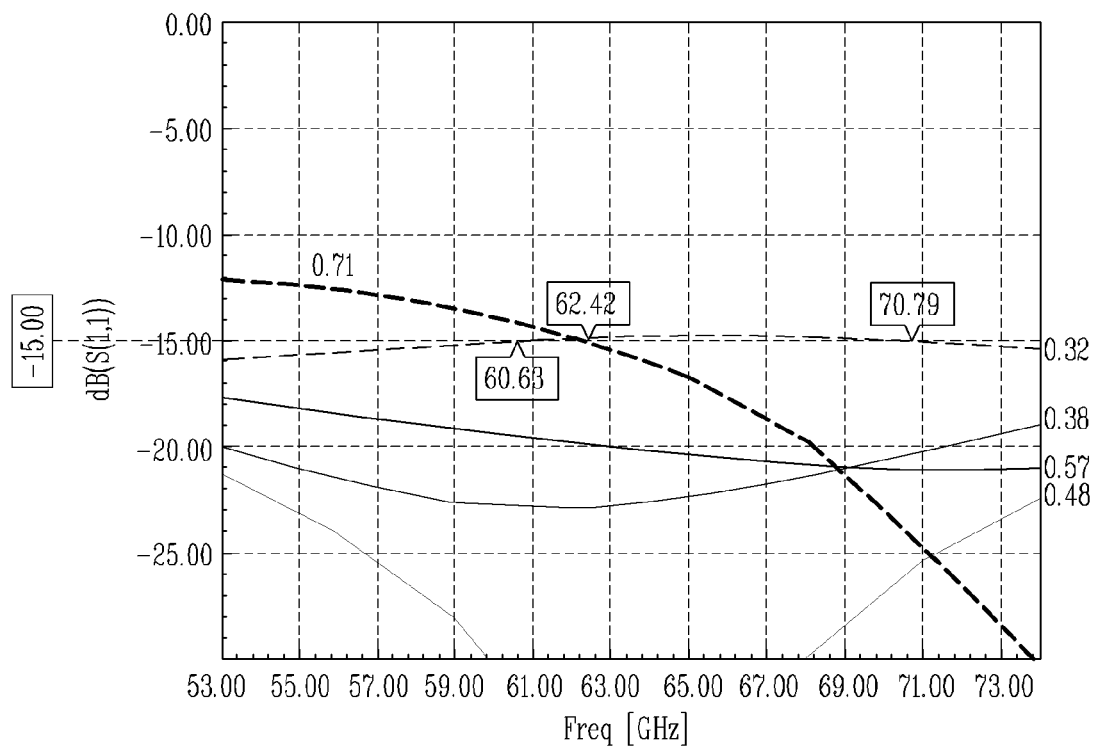
FIG. 10B illustrates reflection coefficient characteristics for each frequency according to a ratio W1/W2 between widths of the first and second impedance transformers.

Referring to FIG. 10B, when the ratio W2/W1 between widths of the first and second impedance transformers 1121 and 1122 is 0.38, 0.48, or 0.57, this indicates stable reflection loss performance of −15 dB or less in a whole band of 57.2 to 70.2 GHz. However, when the ratio W2/W1 between the widths of the first and second impedance transformers is 0.32 or 0.71, reflection loss performance has a value of −15 dB or greater in the operating frequency band. Thus, it may be understood that impedance matching performance is attenuated.

Accordingly, referring to FIGS. 8, 9 and 10B, the ratio W1/W2 between a first width W11 of the first impedance transformer 1121 to the second width W2 of the second impedance transformer 1122 may be set to be within a range from 0.32 to 0.71.

The vertical via 1130 is essentially needed to configure the microstrip line and strip line feeding structure proposed herein. Mismatching between the antenna and the transmission line may occur due to the vertical via 1130 implemented on the multi-layer substrate of the PCB, in an antenna operating in a high band such as a mmWave band.

To resolve the mismatching between the antenna and the transmission line, the first and second transmission lines 1120*a* and 1120*b* may be connected to each other at both sides to have the vertical via 1130 therebetween, and may include the first and second impedance transformers 1121 and 1122.

Figure 11:
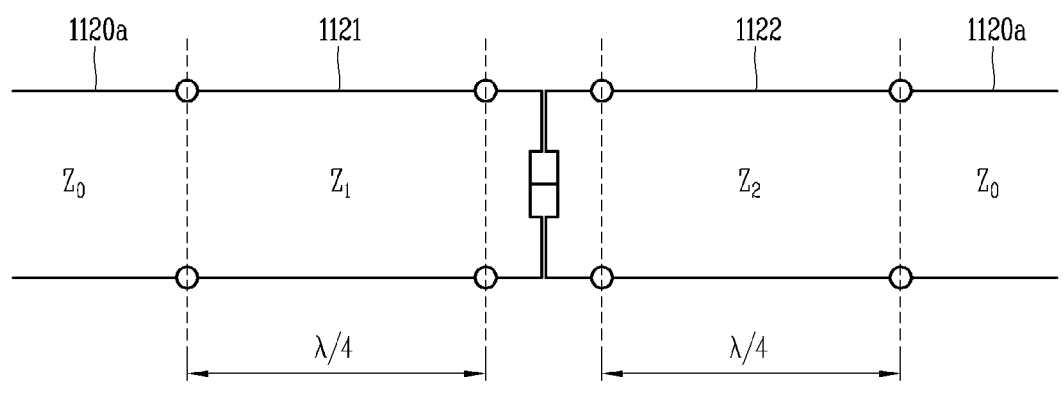
FIG. 11 illustrates an equivalent circuit of an impedance conversion structure proposed in the present specification to solve a problem described above.
Figure 11:
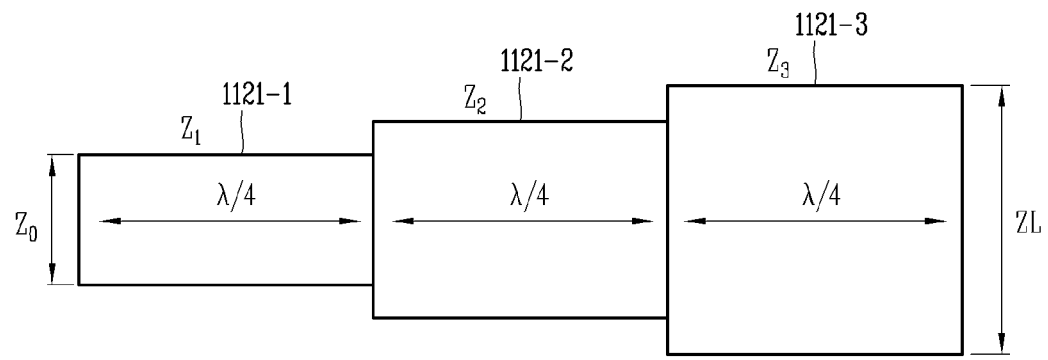
Figure 12A:
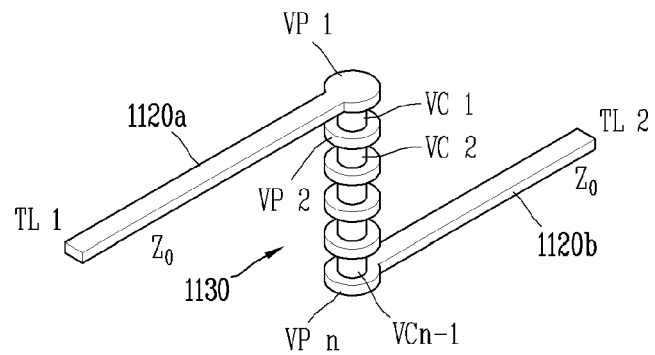
FIGS. 12A to 12C illustrate transmission line structures connected through via holes, respectively, according to various embodiments.
Figure 12B:
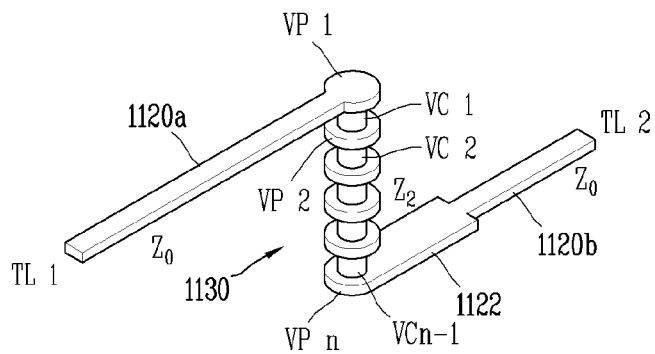
Figure 12C:
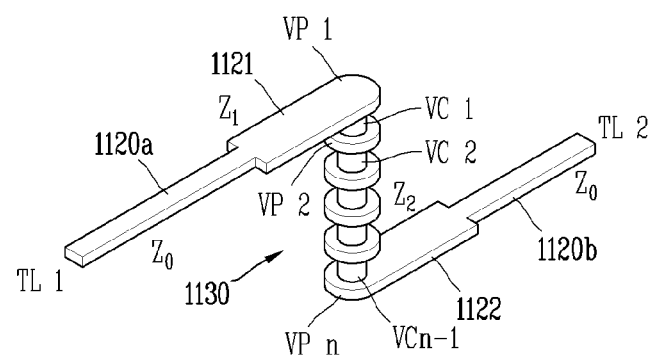

FIG. 11 illustrates an equivalent circuit of an impedance conversion structure proposed herein to solve a problem described above. FIGS. 12A to 12C illustrate transmission line structures connected through a vertical via, respectively, according to various embodiments.

Referring to FIGS. 8 and 9, the first and second transmission lines 1120*a* and 1120*b* include the first and second impedance transformers 1121 and 1122 connected at both sides to have the vertical via 1130 therebetween.

Referring to FIGS. 8 to 11, the first and second impedance transformers 1121 and 1122 are provided to have a length of ¼ of a wavelength corresponding to an operating frequency, and thus may be referred to as a λ/4 conversion device. As such, 50 ohm impedance matching may be performed over a wide bandwidth, using the first and second impedance transformers 1121 and 1122 having a form of the λ/4 conversion device and arranged to face each other at both sides with the vertical via 1130 at a center therebetween.

Referring to FIGS. 8 to 11, the vertical via 1130 may be modeled to have an electrical length corresponding to a load impedance R L and a vertical height h. When the antenna module operates in a low frequency band, an electrical length of the vertical via 1130 may be ignored. However, an electrical length of the vertical via 1130 inside the antenna module operating in a high frequency band such as the mmWave band may not be ignored. Accordingly, in the first and second transmission lines 1120*a* and 1120*b* having a characteristic impedance $Z_0$, that is, 50 ohms, the first and second impedance transformers 1121 and 1122 may be arranged to have a length of λ/4 or less at left and right sides with reference to the load impedance $R_L$, respectively. In relation to this, a wavelength λ may be $\lambda_{eff}$, which is a length reduced according to an effective dielectric constant of a substrate, $e_{eff}$. In the embodiment, the load impedance $R_L$ is configured for the vertical via 1130. However, the scope of protection is not limited to the vertical via 1130, and may extend to any connection structure between different transmission lines.

A characteristic impedance $Z_1$ of the first impedance transformer 1121 may be identical to or different from a characteristic impedance $Z_2$ of the second impedance transformer 1122. The first and second impedance transformers 1121 and 1122 are $\lambda/4$ conversion devices having impedances of $Z_1$ and $Z_2$, respectively, and are located on different layers.

(a) of FIG. 11 illustrates the first and second impedance transformers 1121 and 1122 with a vertical via 1130 at a center therebetween. Referring to (a) of FIG. 11, one impedance transformer is arranged at one side with reference to the vertical via 1130. The $\lambda/4$ conversion device described herein may be configured as a multi-level conversion device having three or more transformers as illustrated in (b) of FIG. 11.

With respect to the multi-level conversion device, the load impedances $Z_L$ and $R_L$ do not directly become 50 ohms through a single conversion device, but are converted through a plurality of impedance transformers in the multi-level conversion device. Referring to FIGS. 8 to 10 and (b) of FIG. 11, a load impedance $Z_L$ in the vertical via 1130 may be impedance-converted into the characteristic impedance $Z_0$ of 50 ohms through a plurality of impedance transformers 1121-1 to 1121-3.

In relation to this, a number of the impedance transformers is not limited to three. A multi-level impedance conversion device including any number of, i.e., two or more impedance transformers may be provided. When two impedance transformers are provided, the two impedance transformers may be referred to as first and second impedance transformers, respectively. A load impedance of about 30 ohms in the vertical via 1130 is impedance-converted into about 40 ohms through the first impedance transformer, and then, into 50 ohms through the second impedance transformer.

A number of impedance transformers at one side may be provided to be different from a number of impedance transformers at the other side with reference to the vertical via 1130. Referring to FIGS. 8 to 11, one of the first and second impedance transformers 1120a and 1120b may be configured as a single impedance conversion device. The other of the first and second impedance transformers 1120a and 1120b may be configured as a multi-level impedance conversion device including two or more impedance transformers.

Referring to FIG. 12A, the first and second transmission lines TL1 and TL2 are positioned on different layers with reference to the vertical via 1130 and connected to each other through the vertical via 1130. In other words, the first and second transmission lines TL1 and TL2 may be connected to each other through the vertical via 1130 including a plurality of via pads VP1, VP2, . . . , VPn and a plurality of vertical connection parts VC1, VC2, . . . , VCn−1. The first and second transmission lines TL1 and TL2 may be implemented without an impedance transformer. However, a via clearance interval of FIG. 8 between the first and second transmission lines TL1 and TL2 and the ground needs to be adjusted for impedance conversion.

Referring to FIG. 12B, the first transmission line TL1 is arranged on a different layer from that of the second transmission line TL2 or 1120b with reference to the vertical via 1130, and connected thereto through the vertical via 1130. In other words, the first transmission line TL1 may be connected to the second transmission line TL2 or 1120b having the second impedance unit 1122 through the vertical via 1130 including the via pads VP1, VP2, . . . , VPn and the vertical connection parts VC1, VC2, . . . , VCn−1. The first transmission line TL1 may be implemented without an impedance transformer. However, a via clearance interval of FIG. 8 between the first and second transmission lines TL1 and TL2 and the ground needs to be adjusted for impedance conversion.

To match an impedance distorted by the vertical via 1130 of FIG. 12B back to $Z_0$, the second impedance transformer 1122, which is a $\lambda/4$ conversion device, is used in the second transmission line TL2. In this case, a line impedance of the second impedance transformer 1122 may be configured as $Z_2$ as illustrated in FIG. 11. Since the impedance distorted by the vertical via 1130 is considered lower than $Z_0$, $Z_2<Z_0$ should be satisfied. Accordingly, a line width of the second impedance transformer 1122 is greater than that of the second transmission line TL2. Meanwhile, a line length of the second impedance transformer 1122 may be configured to have a length of $\lambda/4$ or less.

However, a configuration is not limited to the configuration of FIG. 12B. The second transmission line TL2 may be connected to the vertical via 1130 without an impedance transformer, and the first transmission line TL1 may be connected to the vertical via 1130 through an impedance transformer.

Referring to FIG. 12C, the first impedance transformer 1121 that is a $\lambda/4$ conversion device may be further provided to the first transmission line TL1. Since it is deemed that an impedance of the first impedance transformer 1121 in the first transmission line TL1 in a direction toward the vertical via 1130 is lower than $Z_0$, $Z_1<Z_0$ should be satisfied. Accordingly, a line width of the second impedance transformer 1121 is greater than that of the second transmission line TL2. A length and a width of the first impedance transformer 1121 used in the first transmission line TL1 may be configured to be identical to or different from those of the second impedance transformer 1122 used in the second transmission line TL2 according to a design matter.

Referring to FIGS. 8 to 11 and 12C, the first transmission lines TL1 or 1120a may be configured as a microstrip line, and the second transmission line TL2 or 1120b may be configured as a strip line. An effective permittivity of the microstrip line on which an air layer is provided in an upper portion is lower than an effective permittivity of the strip line. Accordingly, a first width W1 of the first transmission line TL1 or 1120a may be configured to be greater than a second width W2 of the second transmission line TL2 or 1120b.

Referring to FIGS. 8 to 11 and 12C, the first impedance transformer 1121 may be configured to have a first width W1 corresponding to a first impedance in the microstrip line and a first length L1 of a quarter wavelength that is a ¼ of a wavelength corresponding to an operating frequency. The first impedance transformer 1121 may be configured to perform impedance matching between a 50 ohm impedance of the first transmission line 1120a and a second impedance in an upper end region of the vertical via 1130.

The second impedance transformer 1122 may be configured to have a second width W2 corresponding to a third impedance in the strip line and a second length L2 of a quarter wavelength that is a ¼ of a wavelength corresponding to an operating frequency. The second impedance transformer 1122 may be configured to perform impedance matching between a 50 ohm impedance of the second transmission line 1120b and a fourth impedance in an upper end region of the vertical via 1130.

The first width W1 of the first impedance transformer 1121 may be greater than a 50 ohm line width of the first transmission line 1120a. Accordingly, the first impedance of the first impedance transformer 1121 may be configured to be less than 50 ohms.

The second width W2 of the second impedance transformer 1122 may be configured to be greater than a 50 ohm line width of the second transmission line 1120b and less than the first width W1. Accordingly, the second impedance of the first impedance transformer 1122 may be configured to be less than 50 ohms. The second impedance of the second impedance transformer 1122 may be configured to be greater than the first impedance of the first impedance conversion unit 1121.

Referring to FIGS. 8 to 11 and 12B, one of the first and second transmission lines 1120a and 1120b may be configured only as a transmission line having 50 ohms without an impedance transformer. For example, the first transmission line 1120a may be configured only as a transmission line having 50 ohms without an impedance transformer. To do so, the first width W1 of the first impedance transformer 1121 may be configured to be same as a 50 ohm line width of the first transmission line 1120a. In this case, the second width W2 of the second impedance transformer 1122 may be configured to be different from (greater than) a 50 ohm line width of the second transmission line 1120b.

As another example, the second transmission line 1120b may be configured only as a transmission line having 50 ohms without an impedance transformer. To do so, the second width W2 of the second impedance transformer 1122 may be configured to be same as a 50 ohm line width of the second transmission line 1120b. In this case, the first width W1 of the first impedance transformer 1121 may be configured to be different from (greater than) a 50 ohm line width of the first transmission line 1120a.

Figure 13A:
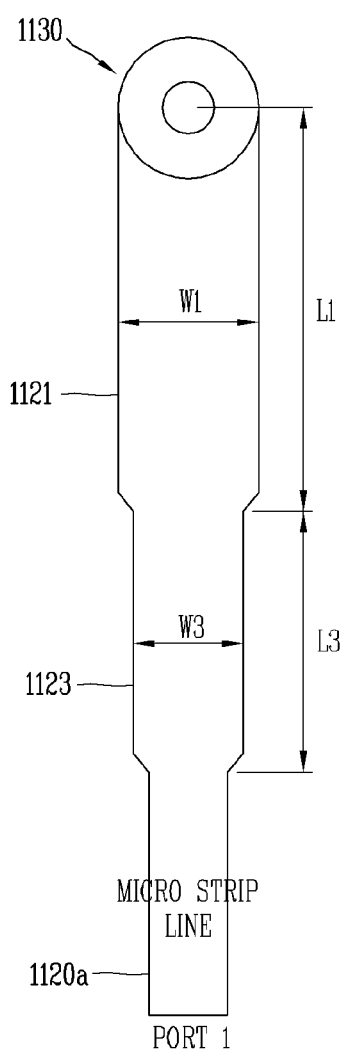
FIG. 13A illustrates a configuration of impedance-conversion is performed via a plurality of impedance transformers in a case of connection of a microstrip line to a vertical via.
Figure 13B:
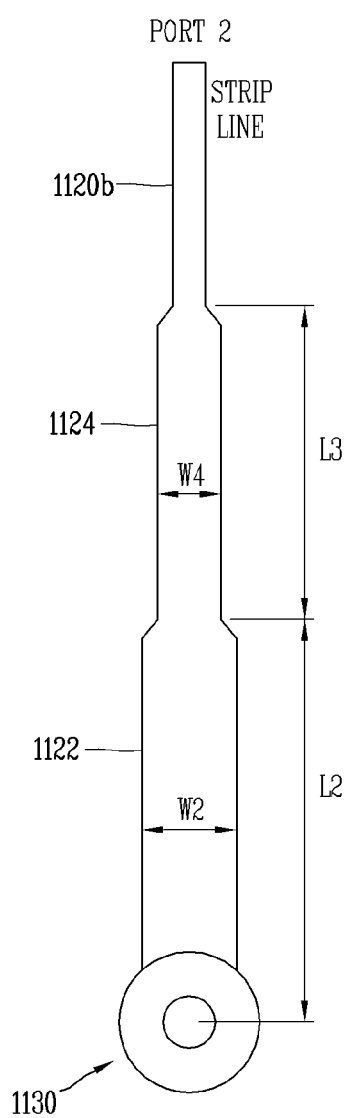
FIG. 13B illustrate a configuration of impedance-conversion is performed via a plurality of impedance transformers in a case of connection of a strip line to a vertical via.

A multi-layer impedance conversion structure according to another embodiment of the present specification may be configured as an asymmetric structure including a different number of impedance transformers with reference to the vertical via 1130. In relation to this, FIG. 13A illustrates a configuration in which impedance-conversion is performed via a plurality of impedance transformers in a case of vertical via connection in a microstrip line. FIG. 13B illustrate a configuration in which impedance-conversion is performed via a plurality of impedance transformers in a case of vertical via connection in a strip line.

Referring to FIG. 13A, the first transmission line 1120a may be configured to include the first impedance transformer 1121 and a third impedance transformer 1123. The first impedance transformer 1121 may be connected to the vertical via 1130 and configured to have the first width W1 and the first length L1. The third impedance transformer 1123 may be connected to one end of the first impedance transformer 1121 and may be configured to have a third width W3 and a third length L3. The third impedance transformer 1123 may be configured to perform impedance conversion between the first impedance transformer 1121 and the first transmission line 1120a with 50 ohm impedance. To do so, the third width W3 of the third impedance conversion unit 1123 may be configured to be less than the first width W1 of the first impedance conversion unit 1121, and greater than a 50 ohm line width of the first transmission line 1120a.

Referring to FIG. 13B, the second transmission line 1120b may be configured to include the second impedance transformer 1122 and a fourth impedance transformer 1124. The second impedance transformer 1122 may be connected to the vertical via 1130 and configured to have the second width W2 and the second length L2. The fourth impedance transformer 1124 may be connected to one end of the second impedance transformer 1122 and configured to have a fourth width W4 and a fourth length L4. The fourth impedance transformer 1124 may be configured to perform impedance conversion between the second impedance transformer 1122 and the second transmission line 1120b with 50 ohm impedance. To do so, the fourth width W4 of the third impedance transformer 1124 may be configured to be less than the second width W2 of the second impedance transformer 1122, and greater than a 50 ohm line width of the second transmission line 1120b.

The embodiment of FIG. 13A may be combined with the embodiment of FIG. 9 so that a region of the microstrip line may include two or more impedance transformers, and a region of the strip line may include one impedance transformer. As another example, the embodiment of FIG. 13A may be combined with the embodiment of FIG. 9 so that the microstrip line region may include two or more impedance transformers and the strip line region may also include two impedance transformers.

The embodiment of FIG. 13B may be combined with the embodiment of FIG. 9 so that the strip line region may include two or more impedance transformers, and the microstrip line region may include one impedance transformer.

Figure 14A:
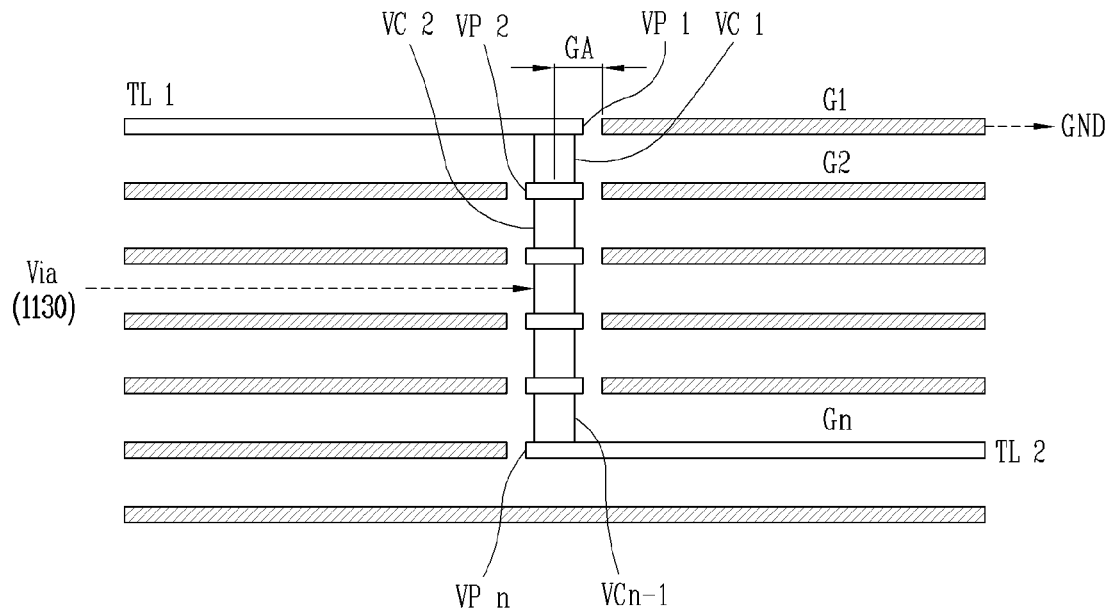
FIG. 14A illustrates a multi-layered conversion structure in which a vertical via is arranged in each layer to be apart from a ground layer by a same distance.
Figure 14B:
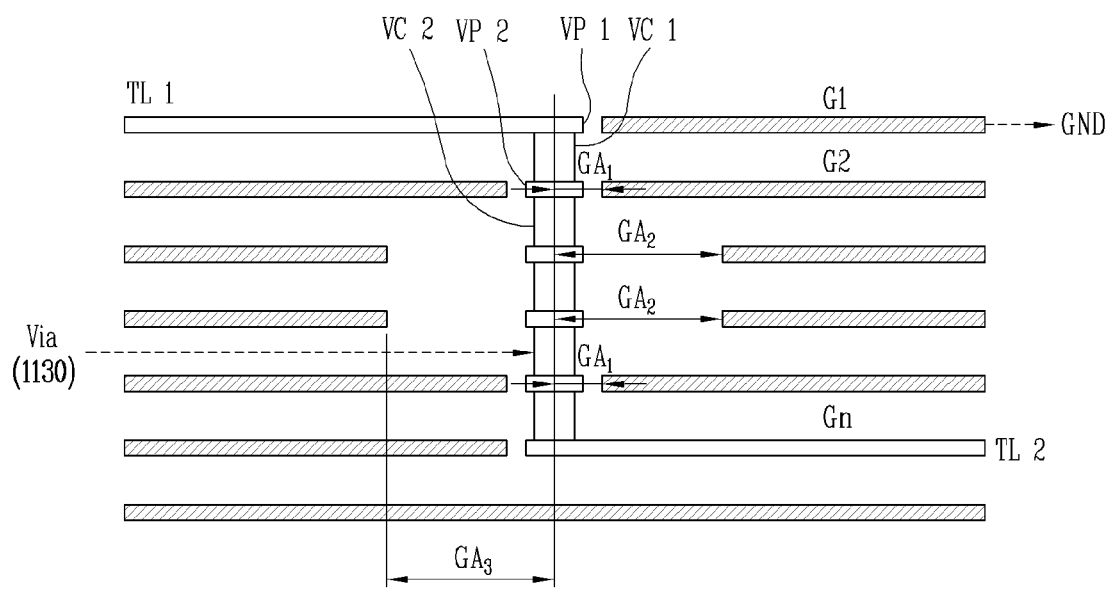
FIG. 14B illustrates a multi-layered conversion structure in which a vertical via is arranged on each layer to be apart from a ground layer by a different distance.

In the multi-layer impedance conversion structure described herein, a ground layer may be arranged on each layer of the vertical via 1130. In relation to this, FIG. 14A illustrates a structure in which the vertical via is spaced apart from the ground layer on each layer by a same distance in a multi-layered impedance conversion structure. FIG. 14B illustrates a structure in which the vertical via is spaced apart from the ground layers on respective layers by different distances in a multi-layered impedance conversion structure.

Referring to FIGS. 8, 14A, and 14B, the vertical via 1130 may be configured to vertically connect a microstrip line TL1 arranged on an uppermost layer L1 of the multi-layer substrate to a strip line TL2 arranged in the multi-layer substrate. To do so, the vertical via 1130 may be configured to include a plurality of via pads VP1, VP2, ..., VPn and a plurality of vertical connection parts VC1, VC2, ..., VCn−1. The via pads VP1, VP2, ..., VPn are arranged on different layers L1 to Ln, and may be arranged on same layers as the grounds G1, G2, ..., Gn, respectively, with a gap GA having a certain width therebetween.

In relation to this, a distance from a center of the vertical via 1130 to each of the grounds G1, G2, ..., Gn arranged on each layer may be defined as a gap. Referring to FIG. 14A, gap intervals from the center of the vertical via 1130 to the grounds G1, G2, ..., Gn may be same for respective layers.

FIG. 14B illustrates a modified design structure of a via gap for preventing impedance distortion due to the vertical via 1130. Referring to FIG. 14B, a multi-layer impedance conversion structure including a feeding line and a via is configured to connect one or more of the transmission lines TL1 and TL2 located on different layers. The multi-layer impedance conversion structure is configured to further include the vertical via 1130 and layers of the ground G1, G2, ..., n adjacent to the vertical via 1130, the vertical via 1130 being configured to physically connect one of more of the transmission lines TL1 and TL2 to each other.

When only one transmission line is present, the vertical via 1130 not being connected to the transmission line may be regarded as having only a via pad and a vertical connection part. As an example, the vertical via 1130 having only a via pad and a vertical connection part may be configured as a ground via connected to a ground. Alternatively, the vertical via 1130 may not be impedance converted to a 50 ohm line, and may be configured to be directly connected to any point of an antenna. In relation to this, referring to FIGS. 8 and 14B, the vertical via 1130 may not be connected to the second transmission line TL2, but may be directly connected to the lower antenna 1100L.

Referring to FIGS. 8 and 14B, the via pads VP1, VP2, . . . , VPn may be spaced apart from the ground G1, G2, . . . , Gn arranged on same layers, respectively, by a same gap interval. On the other hand, referring to FIGS. 8 and 14B, the via pads VP1, VP2, . . . , VPn may be arranged on same layers as the ground G1, G2, . . . , Gn, respectively, to have gaps with certain different widths therebetween.

Referring to FIG. 14B, like a modified embodiment of the via clearance, an impedance may be adjusted by providing gap intervals in respective layers, i.e., GA1 and GA2 to have different sizes. GA1 denotes a via gap between each of the transmission lines TL1 and TL2 and a ground. On the other hand, GA2 denotes a via gap between the ground and the vertical via 1130 arranged in a vertical region between the transmission lines TL1 and TL2. A plurality of the via gaps GA1 and GA2 present in the respective layers may be different from each other. As an example, a relationship between the via gaps GA1 and GA2 may be set as being GA1<GA2, but is not limited thereto.

As described above, a gap between layers on which the first and second transmission lines TL1 and TL2 are arranged may be configured as the via gap GA1, and a gap interval in the multi-layer substrate may be configured to increase in the via gap GA2. Accordingly, ground layers may be arranged horizontally adjacent to the vertical via 1130 above and below the second transmission line TL2 to provide a strip line over a whole length in a horizontal direction. However, gap intervals having different certain widths are not limited to the configuration of FIG. 14B.

As another example, a gap between layers on which the first and second transmission lines TL1 and TL2 are arranged may be configured as the via gap GA2, and a gap interval in the multi-layer substrate may be configured to further decrease in the via gap GA1. Accordingly, a characteristic impedance of the vertical via 1130 may be configured to decrease in the multi-layer substrate, and increase in an upper or lower portion of the multi-layer substrate.

GA3 denotes a via gap interval provided in opposite sides of the via gaps GA1 and GA2 with reference to the vertical via 1130. Impedance control performance may be enhanced by providing an asymmetric structure by adjusting a value of GA3 to be different from values of GA1 and GA2.

A via gap modification design structure of FIG. 14B may be used with a λ/4 conversion device structure according to the various embodiments of FIGS. 12A to 12C. Referring to FIGS. 8, 9, 12A to 12C, and 14B, the via pads VP1, VP2, . . . , VPn may be arranged on different layers, and arranged on same layers as layers of the ground G1, G2, . . . , Gn, respectively, to have gaps with certain different widths therebetween. In relation to this, at least one of the first impedance transformer 1120a and the second impedance transformer 1120b may be implemented to have a line width of 50 ohms. Accordingly, a length of a transmission line may be reduced by implementing at least one of the first and second transmission lines TL1 and TL2 without an impedance transformer. Accordingly, in a high frequency band such as a mmWave band, a line loss in the transmission line may be minimized.

Figure 15A:
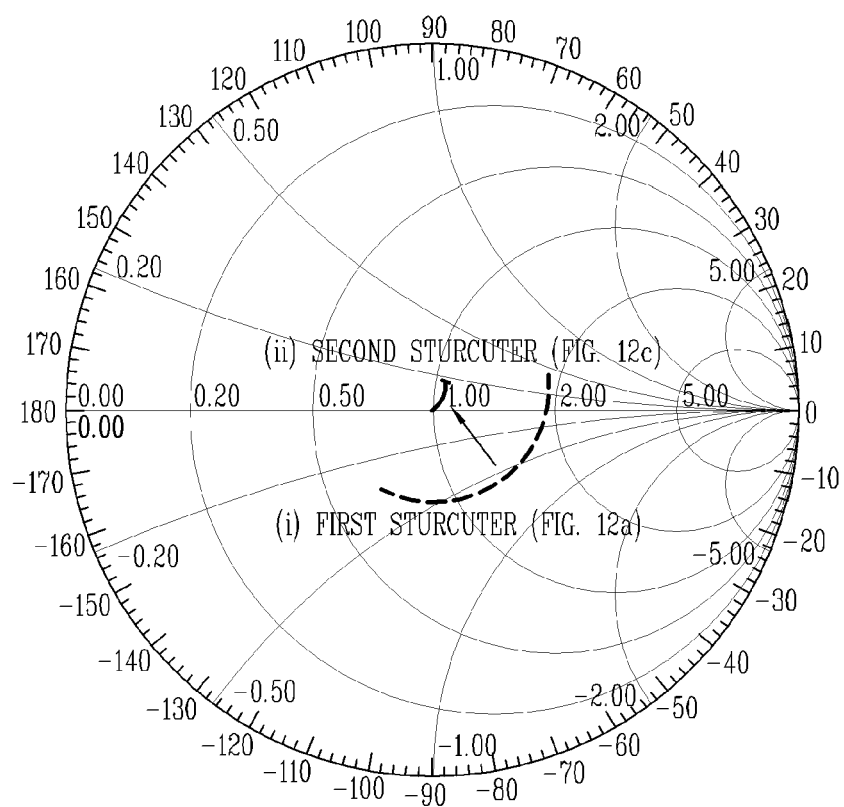
FIG. 15A illustrates impedance changes in a first structure and a second structure on a Smith chart, the first structure including feeding lines connected to each other through a vertical via and the second structure including a multi-layer impedance transformer.
Figure 15B:
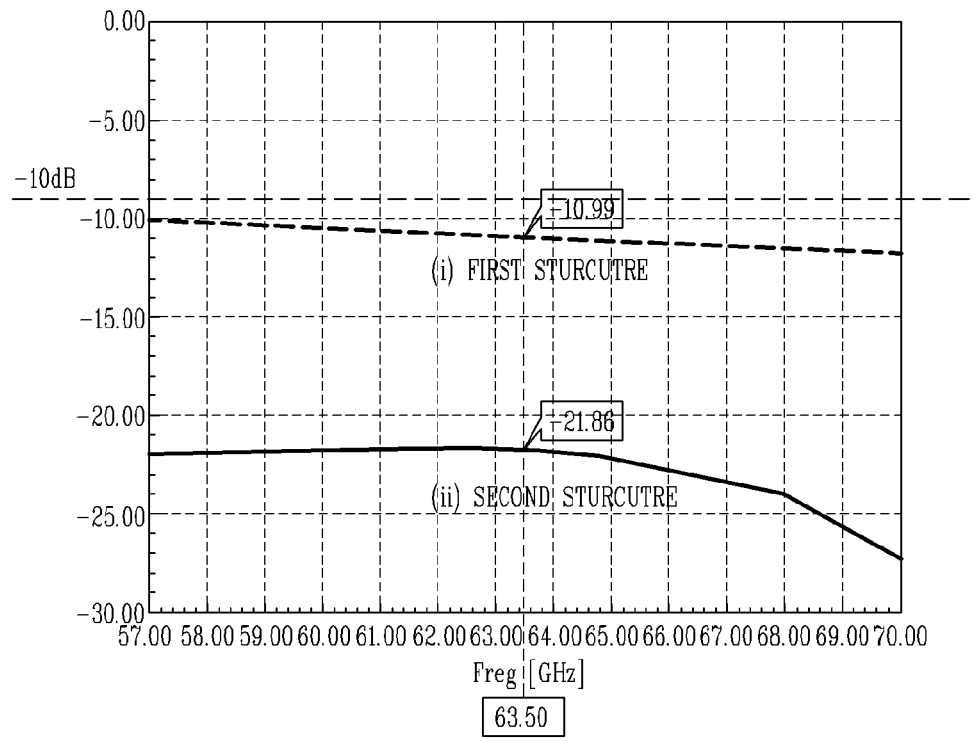
FIG. 15B illustrates a reflection loss and a transmission loss according to frequency changes in the first and second structures of FIG. 15A.
Figure 15B:
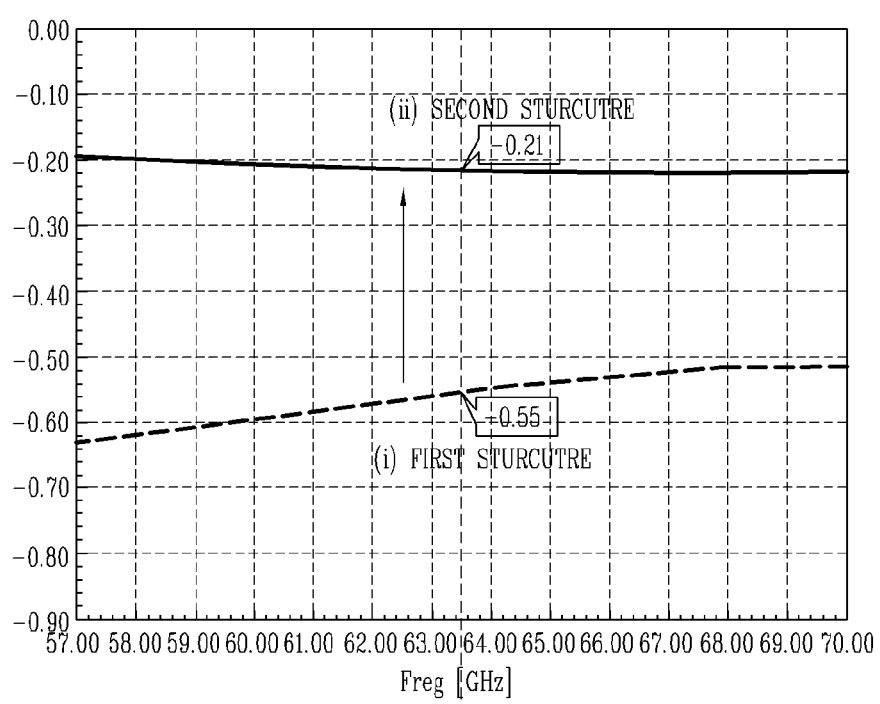

Electrical characteristics of the multi-layer impedance conversion structure described herein are as described below. In relation to this, FIG. 15A illustrates impedance changes in a first structure and a second structure on a Smith chart, the first structure including feeding lines connected to each other through a vertical via and the second structure including a multi-layer impedance transformer. FIG. 15B illustrates a reflection loss and a transmission loss according to frequency changes in the first and second structures of FIG. 15A.

With respect to FIG. 15A, the first structure is a structure in which the first and second transmission lines TL1 and TL2 are connected to each other by the vertical via 1130 without an impedance transformer, as shown in FIG. 12A, On the other hand, the second structure is a structure in which the first and second transmission lines TL1 and TL2 are connected to each other by the first and second impedance transformers 1121 and 1122 to have the vertical via 1130 therebetween, as shown in FIG. 12C.

Referring to FIGS. 12A, 12C, and 15A, an impedance characteristic of the first structure is significantly spaced apart from a center corresponding to 50 ohms, as shown in the Smith chart. The first structure is a structure in which only a feeding line including the first and second transmission lines TL1 and TL2, and the vertical via 1130 are present. On the other hand, an impedance characteristic of the second structure is arranged at the center corresponding to 50 ohms, and a change according to a frequency change is small. The second structure is a structure in which the first and second transmission lines TL1 and TL2 are connected to each other by the first and second impedance transformers 1121 and 1122 having different line widths with reference to the vertical via 1130.

(a) of FIG. 15B illustrates a reflection loss according to frequency changes in the first and second structures of FIG. 15A. (i) In the first structure of (a) of FIG. 15B, a reflection loss for each frequency has a value equal to or less than −10 dB, and equal to or greater than −15 dB. On the other hand, (ii) in the second structure of (a) of FIG. 15B, a reflection loss for each frequency has a value of −20 dB or less in a band from 57 to 70 GHz. Accordingly, in a case of a reflection loss corresponding to S11, when the multi-layer impedance conversion structure described herein is used, an effect of performance improvement by about 10 dB or greater in the band of 57 to 70 GHz may be obtained.

(b) of FIG. 15B illustrates a transmission loss according to frequency changes in the first and second structures of FIG. 15A. (i) In the first structure of (b) of FIG. 15B, a transmission loss for each frequency has a value equal to or greater than −0.5 dB. On the other hand, (ii) in the second structure of (b) of FIG. 15B, a transmission loss for each frequency has a value of about 0.2 in the band from 57 to 70 GHz. Accordingly, when the multi-layer impedance conversion structure described herein is used, a performance improvement effect such that a transmission loss corresponding to S21 in the band from 57 to 70 GHz is reduced by a half or more may be obtained.

Figure 16A:
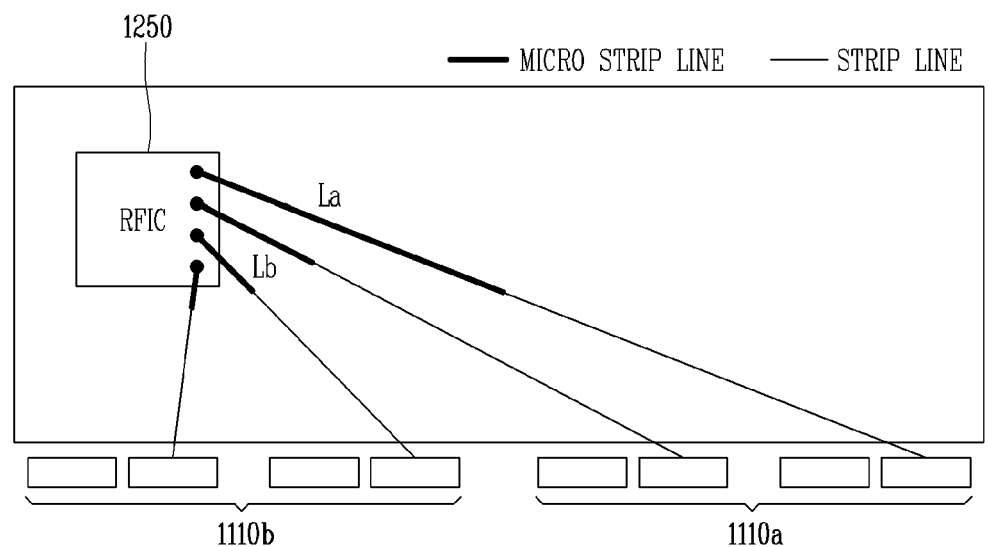
FIG. 16A illustrates a configuration in which a plurality of ports of the RFIC are connected to the plurality of antenna devices.
Figure 16B:
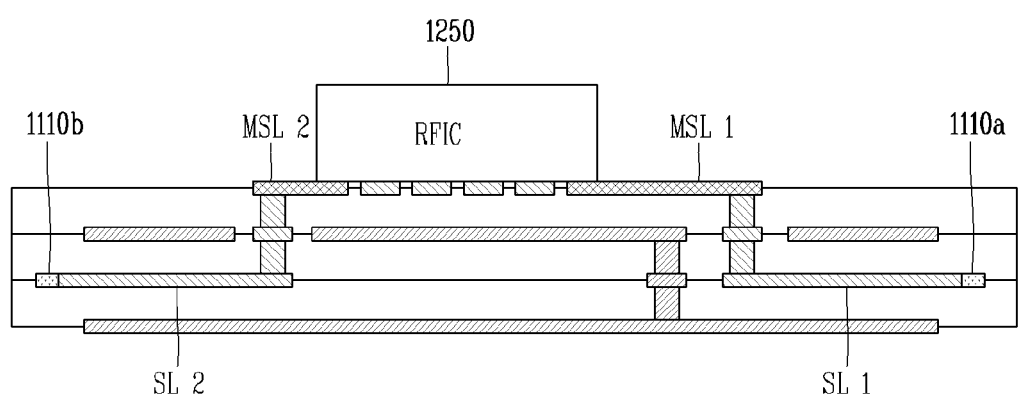
FIG. 16B is a side view illustrating the RFIC connected to the plurality of antenna devices on a multi-layer substrate.

The multi-layer impedance conversion structure described herein may be configured such that a plurality of ports of the RFIC are connected to a plurality of antenna elements. In relation to this, FIG. 16A illustrates a configuration in which the ports of the RFIC are connected to the antenna devices. FIG. 16B is a side view illustrating the RFIC connected to the plurality of antenna devices on a multi-layer substrate.

Referring to FIGS. 16A and 16B, in the array antennas 1100a and 1100b, a line length of the first antenna 1100a far apart from the RFIC 1250 is different from a line length of the second antenna 1100b close to the RFIC 1250. In this case, a length La of the first microstrip line of the first antenna 1100a may be greater than a length Lb of a microstrip line of the second antenna 1100b. The first antenna 1100a and the second antenna 1100b of FIG. 16 are illustrated as side antennas, but are not limited thereto. A configuration for adjusting a line length may be applied to the lower antenna or the upper antenna.

Since the first antenna 1100a has a whole line length greater than that of the second antenna 1100b, the length La of the first microstrip line of the first antenna 1100a may be configured to be greater to minimize a phase difference between signals applied to the first antenna 1100a and the second antenna 1100b. Accordingly, a line loss in the whole line of the first antenna 1100a may be reduced, and a phase difference from the second antenna 1100b may be reduced. In relation to this, since an upper region of the microstrip line is exposed to air, an effective permittivity is lower compared to that of a structure in which a dielectric is arranged in the upper and lower portions. Accordingly, an electrical length of an RF signal proceeding through a feeding line implemented as a microstrip line is shorter than an electrical length of an RF signal proceeding through a feeding line implemented as a strip line. Accordingly, an electrical length difference between the first antenna 1100a and the second antenna 1100b may be reduced, compared to a physical length difference therebetween.

With respect to the above-described technical configurations, the antenna module 1100 may be configured to include the first antenna 1100a and the second antenna 1100b arranged further apart from the transceiver circuit 1250 than the first antenna 1100a. The transceiver circuit 1250 is connected to the first antenna 1100a through a first microstrip line MSL1 and a first strip line SL1. In addition, the transceiver circuit 1250 is connected to the second antenna 1100b through a second microstrip line MSL2 and a second strip line SL2.

In relation to this, a length of the second microstrip line MSL2 may be greater than a length of the first microstrip line MSL1. Accordingly, a difference between a length from the transceiver circuit 1250 to the first antenna 1110a and a length from the transceiver circuit 1250 to the second antenna 1110b may be compensated for. Accordingly, an electrical length difference between the first antenna 1100a and the second antenna 1100b may be reduced, compared to a physical length difference therebetween.

The first antenna 1100a and the second antenna 1100b may refer to different antenna elements in the array antenna. As another example, the first antenna 1100a and the second antenna 1100b may refer to different antenna elements constituting different array antennas, respectively. The electronic device may be configured to perform beamforming through an array antenna, as illustrated in FIG. 3B. The electronic device may use a plurality of array antennas to communicate with a plurality of electronic devices or perform MIMO as illustrated in FIGS. 4 and 6.

As an example, the first antenna 1100a and the second antenna 1100b configured as different antenna elements in an array antenna may partially compensate for a physical distance difference therebetween with reference to the RFIC 1250 by adjusting lengths of the microstrip lines to be different from each other.

Even when the physical distance difference is compensated for by adjusting the lengths of the microstrip lines to be different from each other, an electrical length difference therebetween with reference to the RFIC 1250, i.e., a phase difference may still occur. To compensate for this phase difference, phase values of phase shifters in the antennas 1100a and 1100b may be adjusted to control phases of signals applied to the antennas 1100a and 1100b to be equal to each other, respectively.

Figure 18:
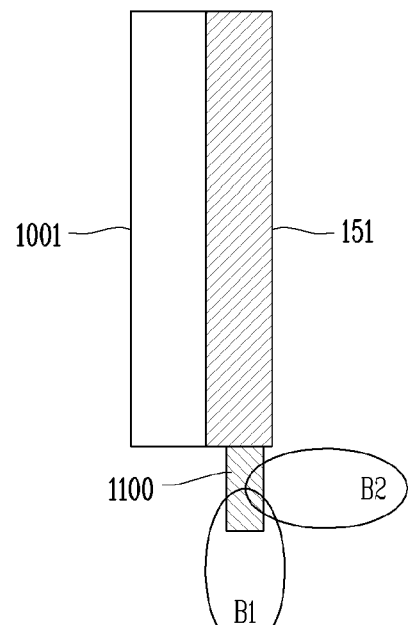
FIG. 18 illustrates antenna modules combined to have different combination structures at a particular position in the electronic device.
Figure 18:
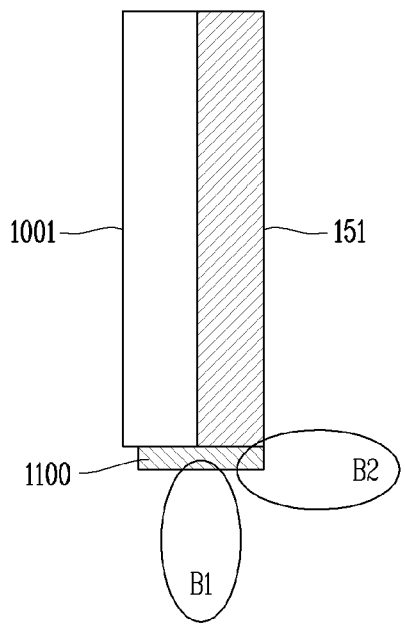
Figure 18:
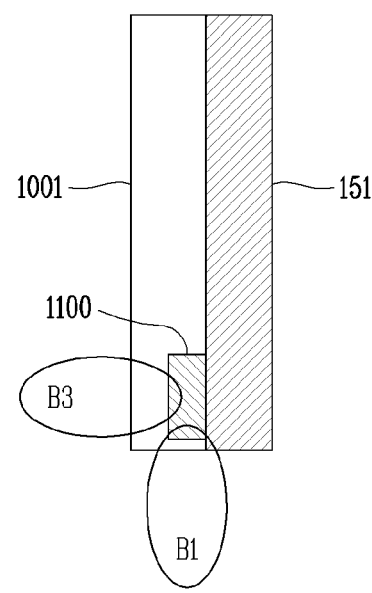

The upper antenna 1100U, the lower antenna 1100L, or the side antenna 1100S of FIG. 8 disclosed herein may be configured as array antennas. By adjusting phases of the signals applied to the respective array antennas to be same, a beam may be oriented toward a center direction. In relation to this, a direction of the beam oriented toward the center direction may be a direction toward a first beam B1 or a second beam B2 as illustrated in FIG. 18.

On the other hand, beam forming may be performed so that the beam direction is tilted from the center direction to a predetermined direction by adjusting phases of signals applied to each element of the respective array antennas to be different from each other. To do so, the transceiver circuit 1250 may control the phase shifter to vary the phases of the signals applied to each antenna element. Accordingly, a direction of a beam-formed signal may be changed in correspondence with a certain angle from a direction of the first beam B1 to a direction of the second beam B2 both shown in FIG. 18. Accordingly, as illustrated in FIG. 3B, beamforming may be performed so that each electronic device radiates a signal in an optimal direction.

Figure 17A:
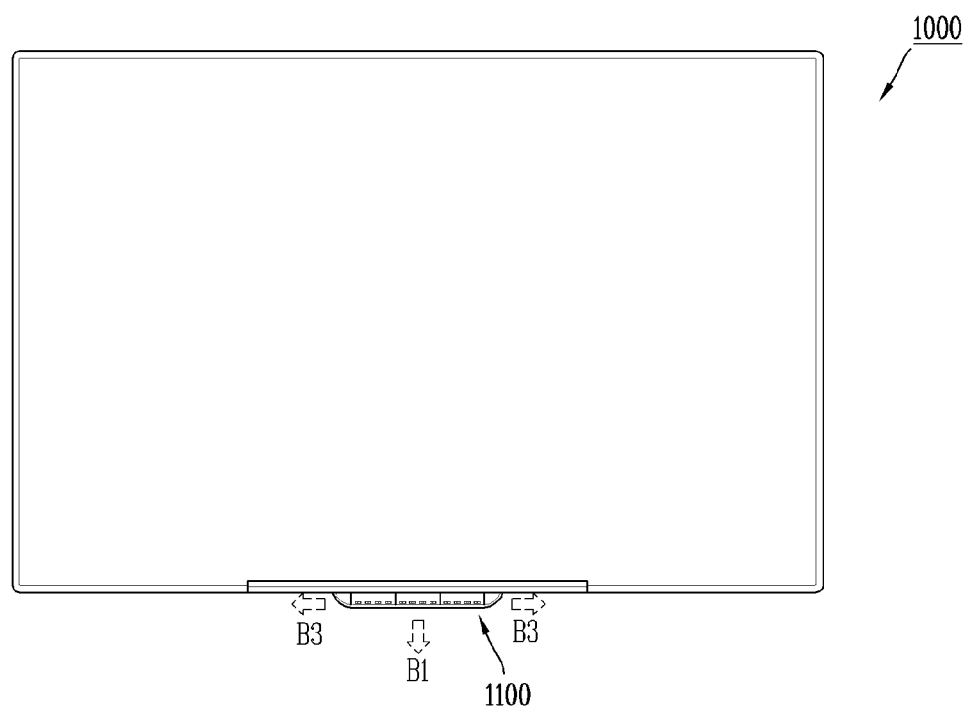
FIG. 17A illustrates a structure in which an antenna module 1100 including a first type antenna and a second type antenna both provided as an array antenna is arranged in an electronic device 1000.
Figure 17B:
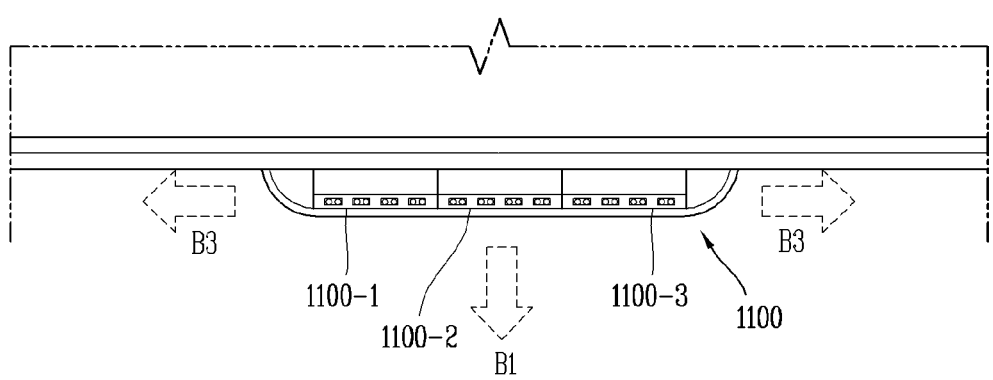
FIG. 17B is a magnified view of a plurality of array antenna modules.

The side antenna 1100S or the lower antenna 1100L, each disclosed herein as having a multi-layer impedance structure, may be configured as an array antenna. In relation to this, FIG. 17A illustrates a structure in which the antenna module 1100 including a first type antenna and a second type antenna provided as an array antenna is arranged in an electronic device 1000. FIG. 17B is a magnified view of a plurality of array antenna modules.

Referring to FIGS. 1 to 17B, an array antenna may include a first array antenna module 1100-1 and a second array antenna module 1100-2 arranged apart from the first array antenna module 1100-1 by a certain distance in a first horizontal direction. Array antenna modules are not limited to two array antenna modules. Three or more array antenna modules may be implemented as illustrated in FIG. 17B. Accordingly, the array antenna may be configured to include first to third array antenna modules 1100-1 to 1100-3. As an example, at least one of the first to third array antenna module 1100-1 to 1100-3 may be arranged on a side surface of the antenna module 1100 and configured to provide a beam in a side direction B3.

As another example, at least one of the first array antenna module 1100-1 and the third array antenna module 1100-3 may be arranged on a front surface of the antenna module 1100 and configured to provide a beam in a front direction B1. In relation to this, first and second beams may be provided in the front direction B1 using the first array antenna module 1100-1 and the second array antenna module 1100-2, respectively. The processor 1400 corresponding to the modem of FIG. 5C may control to provide the first beam and the second beam in the first direction and the second direction using the first and second array antenna modules 1100-1 and 1100-2, respectively. That is, the processor 1400 may provide the first beam from a horizontal direction to the first direction using the first array antenna module 1100-1. In addition, the processor 1400 may provide the second beam from the horizontal direction to the second direction using the second array antenna module 1100-2. In relation to this, the processor 1400 may perform MIMO using the first beam in the first direction and the second beam in the second direction.

The processor 1400 may provide a third beam in a third direction using the first and second array antenna modules 1100-1 and 1100-2. In relation to this, the processor 1400 may control the transceiver circuit 1250 to synthesize signals received through the first and second array antenna modules 1100-1 and 1100-2. Also, the processor 1400 may control the signals transmitted to the first and second array antenna modules 1100-1 and 1100-2 through the transceiver circuit 1250 to be distributed to each antenna element. The processor 1400 may perform beamforming using a third beam having a beam width smaller than beam widths of the first beam and the second beam.

The processor 1400 may perform MIMO using the first beam in the first direction and the second beam in the second direction, and perform beamforming using the third beam having a beam width smaller than beam widths of the first and second beams. In relation to this, when quality of the first signal and the second signal received from another electronic device in a periphery of the electronic device is equal to or less than a threshold, beamforming may be performed using the third beam.

A number of elements of the array antenna is not limited to two, three, four, or the like as illustrated in the drawing. For example, the number of the elements of the array antenna may extend to 4, 8, 16, or the like. Accordingly, the array antenna may be configured as a 1×2, 1×3, 1×4, 1×5, or 1×8 array antenna.

FIG. 18 illustrates antenna modules combined to have different combination structures at a particular position in the electronic device. Referring to (a) of FIG. 18, the antenna module 1100 may be arranged in a lower region of a display 151 to be substantially horizontal with the display 151. Accordingly, the beam B1 may be generated in a downward direction of the electronic device through a monopole radiator. Another beam, i.e., the second beam B2 may be generated in a front direction of the electronic device through a patch antenna.

Referring to (b) of FIG. 18, the antenna module 1100 may be arranged in a lower region of the display 151 to be substantially vertical to the display 151. Accordingly, the beam B2 may be generated in a front direction of the electronic device through the monopole radiator. Another beam B1, i.e., the first beam B1 may be generated in a downward direction of the electronic device through the patch antenna.

Referring to (c) of FIG. 18, the antenna module 1100 may be arranged in a rear case 1001 corresponding to a mechanical structure. The antenna module 1100 may be arranged substantially parallel to the display 151 in the rear case 1001. Accordingly, the beam B2 may be generated in a downward direction of the electronic device through a monopole radiator. Another beam, i.e., a third beam B3 may be generated in a rear direction of the electronic device through the patch antenna.

An electronic device equipped with an antenna module having a multi-layer impedance conversion structure according to an aspect of the present specification has been described above. Hereinafter, an antenna module having a multi-layer impedance conversion structure according to another aspect of the present specification is described with reference to FIGS. 1 to 18.

The antenna module 1100 disclosed herein includes an antenna element operating in a 60 GHz band, such as a patch radiator, a monopole radiator, or a dipole radiator, that is, any radiator radiating in an upper/lower direction or a side direction of the multi-layer substrate. The antenna module 1100 may include an antenna element and the first and second transmission lines 1120a and 1120b connecting the RFIC 1250 to the antenna element. A frequency band of a signal radiated through the antenna element and a signal transmitted through the first and second transmission lines 1120a and 1120b may be changed according to applications.

In relation to this, in the mmWave band (e.g., 10 GHz to 300 GHz), an antenna and an RFIC arranged on different layers of a multi-layer board corresponding to a PCB need to be connected to each other through a transmission line. In addition, the present specification is to provide a structure of a transmission line connecting feeding lines on different layers of a multi-layer substrate to each other. For example, the antenna module 1100 may be configured to have a bandwidth (BW) of 13 GHz or higher in a 60 GHz band. This is because, in a case of the IEEE 802.11ay, the use frequency band has a wide bandwidth of 57 to 70 GHz.

To achieve this purpose, the antenna module having a multi-layer impedance conversion structure described herein may achieve the above-mentioned purpose by performing the solutions described below. The antenna module 1100 of FIGS. 1 to 18 disclosed herein may be an integral type. As an example, a transmission line is implemented using vias and via pads used in a PCB process, and an antenna is placed on an upper portion, a lower portion or a side portion of the PCB such that antenna elements are provided integrally with the PCB that is the multi-layered substrate.

The antenna module disclosed herein is configured to include the first transmission line TL1 or 1120a, the second transmission line TL2 or 1120b, and the vertical via 1130. The first transmission line TL1 or 1120a may be arranged on a first layer of the antenna module 1100 and configured to be electrically connected to the transceiver circuit 1250. The second transmission line TL2 or 1120b may be arranged on a second layer of the antenna module 1100 and configured to be electrically connected to the antenna 1100U, 1100S, or 1100L. The vertical via 1130 may be configured to vertically connect the first transmission line TL1 or 1120a to the second transmission line TL2 or 1120b.

The first impedance transformer 1121 of the first transmission line TL1 or 1120a connected to the vertical via 1130 may be configured to have a first width W1 and the first length L1. The second impedance transformer 1122 of the second transmission line TL2 or 1120b connected to the vertical via 1130 may be configured to have the second width W2 and the second length L2.

Widths and lengths of the first and second impedance transformers 1121 and 1122 including the microstrip line and the strip line having a multi-layer impedance structure of the antenna module 1100 may be configured within a certain range. Accordingly, electrical performance in the mmWave band may be maintained to minimize a line loss while maintaining bandwidth characteristics of the multi-layer impedance structure.

In relation to this, the first transmission line TL1 or 1120a may be is configured as a microstrip line in which an air layer is provided without a dielectric on a conductive line arranged on a dielectric. The second transmission line TL2 or 1120b may be configured as a strip line in which dielectrics are arranged on and below a conductive line, respectively.

The ratio L1/L2 of the first length L1 of the first impedance transformer 1121 to the second length L2 of the second impedance transformer 1122 may be set to be within a range from 0.45 to 1.35. In addition, the ratio W1/W2 of the first width W1 of the first impedance transformer 1121 to the second width W2 of the second impedance transformer 1122 may be set to within a range from 0.32 to 0.71.

An antenna module having a multi-layer impedance conversion structure operating in a millimeter wave band and an electronic device including the antenna module have been described above. Technical effects of the antenna module having the multi-layer impedance conversion structure operating in a millimeter wave band and the electronic device including the antenna module are described below.

Technical effects of the antenna module having the multi-layer impedance conversion structure operating in a millimeter wave band and the electronic device including the same are described below.

According to an embodiment, an antenna module in which all feeding lines may be arranged using a small number of layers in a space where it is difficult to arrange all the feeding lines may be provided.

According to an embodiment, a feeding line is connected, along minimized detour paths, to all antennas in the mmWave antenna module having an extended coverage to thereby minimize a line loss.

According to an embodiment, both performance of a transmission loss S11 and performance of a transmission loss S21 may be enhanced through impedance matching of feeding lines in a broadband of the millimeter wave band.

According to an embodiment, impedance matching characteristics of an antenna element electrically connected to a feeding line inside a multi-layered board type PCB may be enhanced by configuring different types of impedance transformers with reference to vertical vias.

According to an embodiment, transmission lines including a microstrip line and a strip line are connected to each other via a vertical via and an impedance transformer is provided on at least one side to thereby minimize a line loss while performing impedance matching.

According to an embodiment, by adjusting a gap interval between a vertical via and an adjacent ground, the vertical via connecting transmission lines on different layers to each other, a line loss may be minimized while impedance matching is performed.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art. In relation to the aforementioned disclosure, design and operations of an antenna operating in a mmWave band and an electronic device controlling the same can be implemented as computer-readable codes in a program-recorded medium.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device having an antenna module, the electronic device comprising:
   a transceiver circuit disposed in the antenna module including a multi-layer substrate;
   a first transmission line disposed on a first layer of the antenna module and configured to be electrically connected to the transceiver circuit;
   a second transmission line disposed on a second layer of the antenna module and configured to be electrically connected to an antenna; and
   a vertical via configured to vertically connect the first transmission line and the second transmission line,
   wherein the first transmission line connected to the vertical via comprises a first impedance transformer configured to have a first width W1 and a first length L1, and
   the second transmission line connected to the vertical via comprises a second impedance transformer configured to have a second width W2 and a second length L2.

2. The electronic device of claim 1, wherein the first transmission line comprises a microstrip line in which an air layer is provided without a dielectric on a conductive line arranged on a dielectric, and
   the second transmission line comprises a strip line in which dielectrics are disposed on and below a conductive line, respectively.

3. The electronic device of claim 2, wherein a ratio L1/L2 of the first length L1 of the first impedance transformer to the second length L2 of the second impedance transformer is set to be within a range from 0.45 to 1.35.

4. The electronic device of claim 2, wherein a ratio W2/W1 of the first width W1 of the first impedance transformer to the second width W2 of the second impedance transformer is set to be within a range from 0.32 to 0.71.

5. The electronic device of claim 2, wherein the first impedance transformer is configured, in the microstrip line, to have the first width W1 corresponding to a first impedance and the first length L1 of a quarter wavelength that is a ¼ of a wavelength corresponding to an operating frequency, and
   perform impedance matching between a 50 ohm impedance of the first transmission line and a second impedance in an upper end region of the vertical via.

6. The electronic device of claim 5, wherein the second impedance transformer is configured, in the strip line, to have the second width W2 corresponding to a third impedance and the second length L2 of a quarter wavelength that is a ¼ of a wavelength corresponding to an operating frequency, and
   perform impedance matching between a 50 ohm impedance of the second transmission line and a fourth impedance in a lower end region of the vertical via.

7. The electronic device of claim 6, wherein the first width W1 of the first impedance transformer is greater than a 50 ohm line width of the first transmission line, and
   the second width W2 of the second impedance transformer is greater than a 50 ohm line width of the second transmission line and smaller than the first width W1.

8. The electronic device of claim 2, wherein the vertical via comprises a plurality of via pads and a plurality of vertical connection parts to vertically connect the microstrip line arranged on an uppermost layer of the multi-layer substrate to the strip line arranged in the multi-layer substrate, and
   the plurality of via pads, arranged on different layers, are disposed on same layers as layers of grounds to have gaps with a certain width between the plurality of via pads and the grounds, respectively.

9. The electronic device of claim 8, wherein the plurality of via pads, arranged on different layers, are disposed on same layers as layers of grounds to have gaps with certain different widths between the plurality of via pads and the grounds, respectively, and
at least one of the first impedance transformer and the second impedance transformer are implemented to have a line width of 50 ohms.

10. The electronic device of claim 1, wherein the first width W1 of the first impedance transformer is same as a 50 ohm line width of the first transmission line, and the second width W2 of the second impedance transformer is different from a 50 ohm line width of the second transmission line.

11. The electronic device of claim 1, wherein the second width W2 of the second impedance transformer is same as a 50 ohm line width of the second transmission line, and the first width W1 of the first impedance transformer is different from a 50 ohm line width of the first transmission line.

12. The electronic device of claim 1, wherein the first transmission line comprises:
the first impedance transformer connected to the vertical via and has a first width W1 and a first length L1; and
a third impedance transformer connected to one end of the first impedance transformer and configured to have a third width W3 and a third length L3, to perform impedance conversion between the first impedance transformer and the first transmission line with 50 ohm impedance,
wherein the third width W3 is smaller than the first width W1 and greater than a 50 ohm line width of the first transmission line.

13. The electronic device of claim 1, wherein the second transmission line comprises:
the second impedance transformer connected to the vertical via and configured to have the second width W2 and the second length L2; and
a fourth impedance transformer connected to one end of the second impedance transformer and configured to have a fourth width W4 and a fourth length L4, to perform impedance conversion between the second impedance transformer and the second transmission line with 50 ohm impedance,
wherein the fourth width W4 is smaller than the second width W2 and greater than a 50 ohm line width of the second transmission line.

14. The electronic device of claim 1, wherein the antenna is electrically connected to the second transmission line through a second vertical via, and
the antenna is a lower antenna configured to radiate a signal toward a lower direction of the antenna module.

15. The electronic device of claim 14, wherein the antenna modules further comprise:
the lower antenna; and
a side antenna arranged inside the multi-layer substrate and configured to radiate a signal toward a side direction of the multi-layer substrate.

16. The electronic device of claim 15, further comprising a ground via wall arranged at a further inner position in the multi-layer substrate compared to the side antenna, and configured to vertically connect different ground layers to each other,
wherein the ground via wall is arranged at a further inner position in the multi-layer substrate compared to the side antenna to improve directivity, toward a side direction, of a signal radiated by the side antenna.

17. The electronic device of claim 16, wherein the antenna module comprises a first antenna and a second antenna arranged further apart from the transceiver circuit compared to the first antenna,
the transceiver circuit is connected to the first antenna through a first microstrip line and a first strip line, and connected to the second antenna through a second microstrip line and a second strip line, and
a length of the second microstrip line is greater than a length of the first microstrip line to compensate for a difference between a length from the transceiver circuit to the first antenna and a length from the transceiver circuit to the second antenna.

18. An antenna module comprising:
a first transmission line disposed on a first layer of the antenna module and configured to be electrically connected to a transceiver circuit;
a second transmission line disposed on a second layer of the antenna module and configured to be electrically connected to an antenna;
and a vertical via configured to vertically connect the first transmission line and the second transmission line,
wherein a first impedance transformer is arranged in the first transmission line connected to the vertical via and configured to have a first width W1 and a first length L1, and a second impedance transformer is arranged in the second transmission line connected to the vertical via and configured to have a second width W2 and a second length L2.

19. The antenna module of claim 18, wherein the first transmission line comprises a microstrip line in which an air layer is provided without a dielectric on a conductive line arranged on a dielectric, and
the second transmission line comprises a strip line in which dielectrics are disposed on and below a conductive line, respectively.

20. The antenna module of claim 19, wherein a ratio L1/L2 of the first length L1 of the first impedance transformer to the second length L2 of the second impedance transformer is set to be within a range from 0.45 to 1.35, and
a ratio W2/W1 of the first width W1 of the first impedance transformer to the second width W2 of the second impedance transformer is set to be within a range from 0.32 to 0.71.

* * * * *